US012550298B2

(12) United States Patent
Satoh et al.

(10) Patent No.: US 12,550,298 B2
(45) Date of Patent: Feb. 10, 2026

(54) HEAT SINK AND METHOD OF MANUFACTURING SAME, HEAT EXCHANGER, AND GYROID STRUCTURE COMPONENT AND METHOD OF MANUFACTURING SAME

(71) Applicants: Tomoko Satoh, Kanagawa (JP); Masato Tsuji, Kanagawa (JP)

(72) Inventors: Tomoko Satoh, Kanagawa (JP); Masato Tsuji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 315 days.

(21) Appl. No.: 18/052,584

(22) Filed: Nov. 4, 2022

(65) Prior Publication Data

US 2023/0156969 A1   May 18, 2023

(30) Foreign Application Priority Data

Nov. 15, 2021  (JP) .................................. 2021-185827
Mar. 10, 2022  (JP) .................................. 2022-037444

(51) Int. Cl.
*H05K 7/20* (2006.01)
*B22F 10/14* (2021.01)
*B33Y 10/00* (2015.01)
*B33Y 80/00* (2015.01)

(52) U.S. Cl.
CPC ......... *H05K 7/20509* (2013.01); *B22F 10/14* (2021.01); *B33Y 10/00* (2014.12); *B33Y 80/00* (2014.12); *B22F 2301/052* (2013.01); *B22F 2301/058* (2013.01); *B22F 2301/30* (2013.01); *F28F 2210/02* (2013.01)

(58) Field of Classification Search
CPC ................. H05K 7/20509; B22F 10/14; B22F 2301/052; B22F 2301/058; B22F 2301/30; B22F 5/10; B33Y 10/00; B33Y 80/00; F28F 2210/02; F28F 3/048; F28F 3/12; F28F 13/003; F28F 13/12; F28F 27/02; H01L 21/4871; H01L 23/3731; H01L 23/3736; H01L 23/473; F28D 2021/0029; Y02P 10/25
USPC ........................................................ 165/80.4
See application file for complete search history.

(56) References Cited

U.S. PATENT DOCUMENTS

| 11,719,492 | B2 * | 8/2023 | Tholence ............ | F28D 15/0233 |
| | | | | 165/104.11 |
| 11,725,881 | B2 * | 8/2023 | Felton ................... | C04B 35/111 |
| | | | | 165/164 |
| 2002/0026982 | A1 | 3/2002 | Bredt et al. | |

(Continued)

FOREIGN PATENT DOCUMENTS

| CN | 102652249 B | * 11/2014 | ................ | F28F 7/02 |
| EP | 3401610 A1 | * 11/2018 | .............. | F24F 12/00 |

(Continued)

OTHER PUBLICATIONS

EP 3401610A1 Machine Translation (Year: 2018).*

(Continued)

*Primary Examiner* — Len Tran
*Assistant Examiner* — Gustavo A Hincapie Serna
(74) *Attorney, Agent, or Firm* — XSENSUS LLP

(57) ABSTRACT

A heat sink includes a channel including a gyroid structure portion having a non-uniform thickness.

18 Claims, 16 Drawing Sheets

(56) References Cited

U.S. PATENT DOCUMENTS

| | | | |
|---|---|---|---|
| 2004/0123980 A1* | 7/2004 | Queheillalt | C23C 14/228 165/133 |
| 2004/0175875 A1* | 9/2004 | Sung | H01L 23/3732 257/E23.11 |
| 2008/0149299 A1* | 6/2008 | Slaughter | B22F 3/1115 430/269 |
| 2009/0321045 A1* | 12/2009 | Hernon | B22D 25/02 165/80.2 |
| 2015/0014323 A1* | 1/2015 | Loukus | B32B 3/266 428/34.1 |
| 2017/0367218 A1* | 12/2017 | Gerstler | F28D 9/0093 |
| 2018/0187984 A1* | 7/2018 | Manzo | F28F 13/12 |
| 2018/0238638 A1* | 8/2018 | Roper | B22F 7/004 |
| 2018/0297843 A1* | 10/2018 | Lo | B01J 19/243 |
| 2018/0331016 A1* | 11/2018 | Kang | F28D 20/021 |
| 2019/0021186 A1* | 1/2019 | Poltorak | F28F 13/12 |
| 2019/0131632 A1* | 5/2019 | Hadame | H01M 8/2432 |
| 2019/0274925 A1* | 9/2019 | Vlahinos | B65D 25/108 |
| 2019/0299293 A1* | 10/2019 | Lynch | B01D 53/78 |
| 2020/0033070 A1* | 1/2020 | Vlahinos | B01F 25/43231 |
| 2020/0171753 A1 | 6/2020 | Satko et al. | |
| 2020/0173291 A1* | 6/2020 | Rathay | B22F 3/1115 |
| 2020/0200482 A1* | 6/2020 | Koeune | F28D 7/10 |
| 2020/0215480 A1* | 7/2020 | Roy | B01D 71/022 |
| 2021/0172567 A1* | 6/2021 | Kang | B21F 27/12 |
| 2021/0180885 A1* | 6/2021 | Wiedenhoefer | F28F 13/06 |
| 2021/0320078 A1* | 10/2021 | Zinn | H01L 24/45 |
| 2021/0333061 A1* | 10/2021 | Muceus | F41A 21/30 |
| 2022/0003503 A1* | 1/2022 | Iyer | B01D 69/10 |
| 2022/0033313 A1* | 2/2022 | Allemand | C04B 35/5611 |
| 2022/0196337 A1* | 6/2022 | Torresin | H01L 21/4871 |
| 2022/0243993 A1* | 8/2022 | So | F28D 15/046 |
| 2022/0334555 A1* | 10/2022 | Walsh | B29C 64/386 |
| 2023/0009377 A1* | 1/2023 | Abu Al-Rub | F28F 7/02 |
| 2023/0144182 A1* | 5/2023 | Vial | F01D 5/187 415/115 |
| 2023/0212005 A1* | 7/2023 | Sperrin | C01B 3/0015 423/651 |
| 2023/0314094 A1* | 10/2023 | Brodeur | F28F 7/02 165/164 |
| 2024/0035124 A1* | 2/2024 | Desiles | B22D 19/02 |
| 2024/0167768 A1* | 5/2024 | Suto | F28F 7/02 |

FOREIGN PATENT DOCUMENTS

| | | | | |
|---|---|---|---|---|
| EP | 3401610 B1 * | 3/2021 | | F24F 7/003 |
| JP | 3607300 | 1/2005 | | |
| JP | 2009-177038 | 8/2009 | | |
| JP | 2019-046944 | 3/2019 | | |
| JP | 6623284 B2 * | 12/2019 | | H01L 23/3736 |
| JP | 2020-108975 | 7/2020 | | |
| JP | 2021-103060 A | 7/2021 | | |

OTHER PUBLICATIONS

Office Action issued Jan. 10, 2023 in Japanese Patent Application No. 2022-037444, 4 pages. (with Computer-Generated English Translation).

Ryan O'Hara, "Taking Heat Exchanger Design to the Next Level with High-Performance Geometry", Designing the Optimal Heat Exchanger, Dec. 16, 2019, 8 pages.

Extended European Search Report issued Jan. 30, 2023 in European Patent Application No. 22206515.3, 7 pages.

Office Action issued Mar. 12, 2024 in Japanese Patent Application No. 2023-092054, 4 pages.

* cited by examiner

COMPARATIVE EXAMPLE

COMPARATIVE EXAMPLE

FIG. 14BA COMPARATIVE EXAMPLE
LEFT
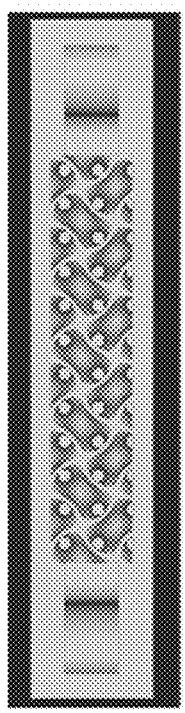
FIG. 14BB COMPARATIVE EXAMPLE
CENTER
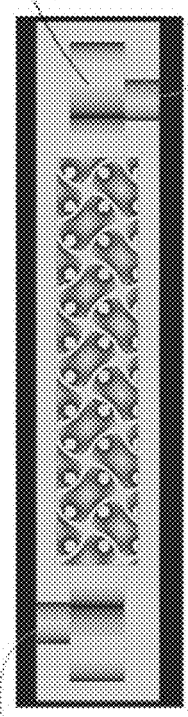
FIG. 14BC COMPARATIVE EXAMPLE
RIGHT
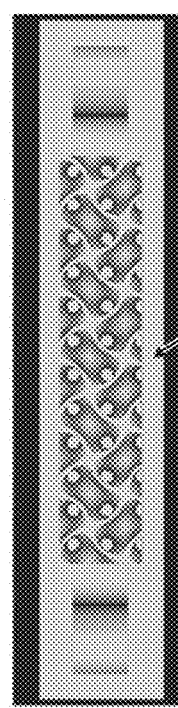
FIG. 15
COMPARATIVE EXAMPLE
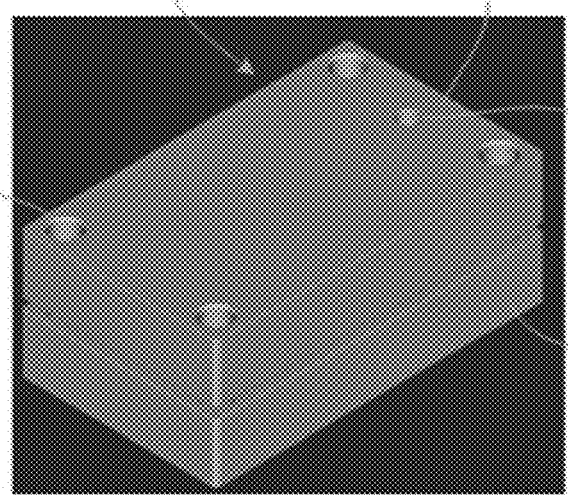

COMPARATIVE EXAMPLE

LEFT

CENTER

RIGHT

COMPARATIVE EXAMPLE

|  | EMBODIMENT 1 | EMBODIMENT 2 | EMBODIMENT 3 | EMBODIMENT 4 | EMBODIMENT 5 |
|---|---|---|---|---|---|
| CELL SIZE | 10 mm | 10 mm | 10 mm | 8 mm | 12 mm |
| THINNEST PORTION | t = 1 mm | t = 1 mm | t = 1 mm | t = 1 mm | t = 1 mm |
| THICKEST PORTION | t = 2 mm | t = 3 mm | t = 4 mm | t = 3 mm | t = 3 mm |

HEAT SINK AND METHOD OF MANUFACTURING SAME, HEAT EXCHANGER, AND GYROID STRUCTURE COMPONENT AND METHOD OF MANUFACTURING SAME

CROSS-REFERENCE TO RELATED APPLICATIONS

This patent application is based on and claims priority pursuant to 35 U.S.C. § 119(a) to Japanese Patent Application Nos. 2021-185827, filed on Nov. 15, 2021, and 2022-037444, filed on Mar. 10, 2022, in the Japan Patent Office, the entire disclosure of each of which is hereby incorporated by reference herein.

BACKGROUND

Technical Field

Embodiments of the present disclosure relate to a heat sink, a method of manufacturing the heat sink, a heat exchanger, a gyroid structure component, and a method of manufacturing the gyroid structure component.

Related Art

Three-dimensional fabrication apparatuses employ various methods to fabricate a three-dimensional object. For example, a three-dimensional fabrication apparatus laminates powder layers to fabricate a three-dimensional object such as a heat sink.

SUMMARY

Embodiments of the present disclosure describe an improved heat sink that includes a channel including a gyroid structure portion having a non-uniform thickness.

According to other embodiments of the present disclosure, there are provided an improved gyroid structure component that includes a gyroid structure portion including a wall having a non-uniform thickness

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 14BA to 14BC are cross-sectional views of the heat sink according to Comparative Example 1 at left, center, and right cross-sectional positions illustrated in FIG. 14A;

FIG. 15 is a schematic perspective view of a heat sink model in which two heat sinks according to Comparative Example 1 are stacked one on another;

Figure 1:
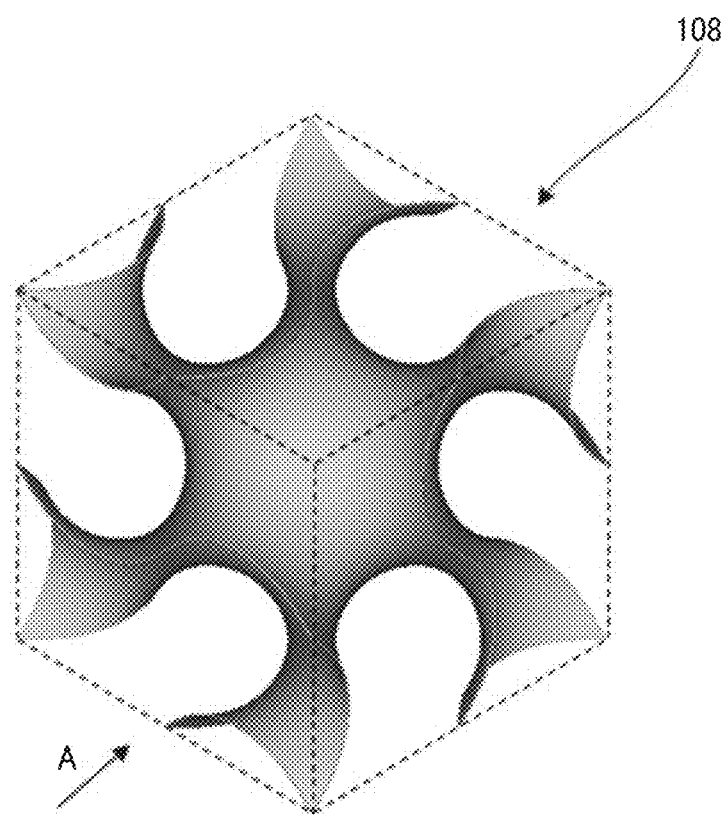
FIG. 1 is a schematic perspective view of a gyroid structure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Gyroid Structure Component A gyroid structure component according to an embodiment of the present disclosure includes a gyroid structure portion including a wall having a non-uniform thickness.

The gyroid structure portion has a gyroid structure defined by the following Equation 1:

$$\sin(X \times P1)\cos(Y \times P2) + \sin(Y \times P2)\cos(Z \times P3) + \sin(Z \times P3)\cos(X \times P1) = 0 \quad \text{Equation 1,}$$

where X, Y, and Z are real numbers ranging from $-\pi$ to $\pi$, and P1, P2, and P3 are real numbers greater than 0.

As expressed by the trigonometric function in Equation 1, the gyroid structure is infinitely connected in three directions of X, Y, and Z.

When P1, P2, and P3 are equal to 1, one cycle of the gyroid structure is $2\pi$ in each of the X, Y, and Z directions. On the other hand, when P1 and P2 are equal to 1 and only P3 is equal to 2, the cycle in the Z direction is $\pi$. Accordingly, the gyroid structure is connected in the Z direction at a half cycle as compared with in the X and Y directions. The values of P1, P2, and P3 may be appropriately set according to a direction of flow in addition to a wall thickness and a cell size of the gyroid structure portion.

In the present embodiment, an X-axis, a Y-axis, and a Z-axis are orthogonal to each other. The Z-axis is vertical, and the X-axis and the Y-axis are horizontal. Note that the directions in which the X-axis, the Y-axis, and the Z-axis extend are not limited to the above example.

The gyroid structure component has a unique shape that can be fabricated by a three-dimensional fabrication apparatus, and is not manufactured in a mold.

The gyroid structure has a three-dimensional periodic minimal surface. The periodic minimal surfaces are infinitely connectable in three different directions and divide a space into two regions. The periodic minimal surfaces of the gyroid structure are infinitely connectable in the directions along the X-axis, along the Y-axis, and along the Z-axis. That is, the gyroid structure has a shape having maximum space filling with a minimum material.

Figure 2:
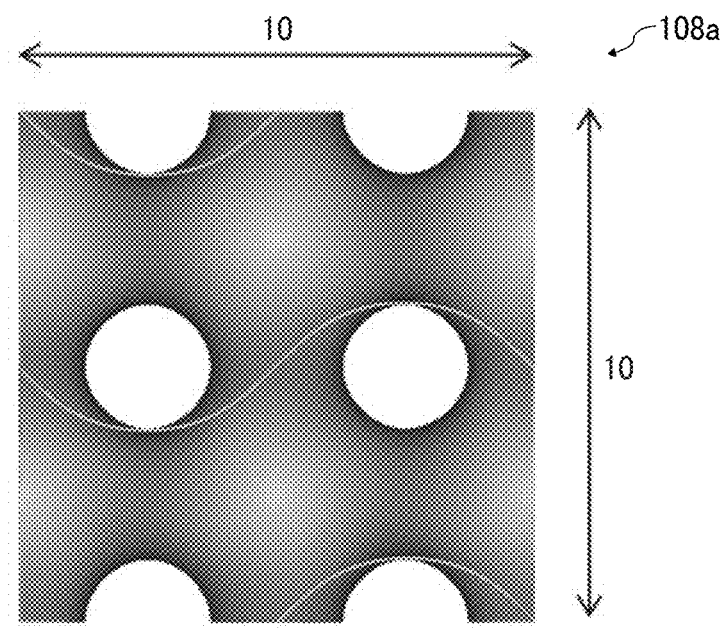
FIG. 2 is a plan view of the gyroid structure in FIG. 1 as viewed in the direction indicated by arrow A in FIG. 1.

FIG. 1 is a schematic perspective view of a gyroid structure 108. FIG. 2 is a plan view of the gyroid structure 108 in FIG. 1 as viewed in the direction indicated by arrow A in FIG. 1.

As illustrated in FIG. 1, the gyroid structure 108 has the triply periodic minimal surfaces that are infinitely connected in three directions, and is defined by a face expressed by Equation 1 using a trigonometric function. When P1, P2, and P3 are equal to 1, one cycle of the gyroid structure 108 is $2\pi$ in each direction.

A cell size is defined by the size of a cube including one cycle of a gyroid structure (i.e., a unit cell 108a illustrated in FIG. 2). For example, a cell size of 10 indicates that one cycle of the gyroid structure 108 is formed in a space of 10 mm×10 mm×10 mm as illustrated in FIG. 2.

A face 131 (see FIG. 3) indicated by X, Y, and Z that satisfies Expression 1 has no thickness.

Figure 3:
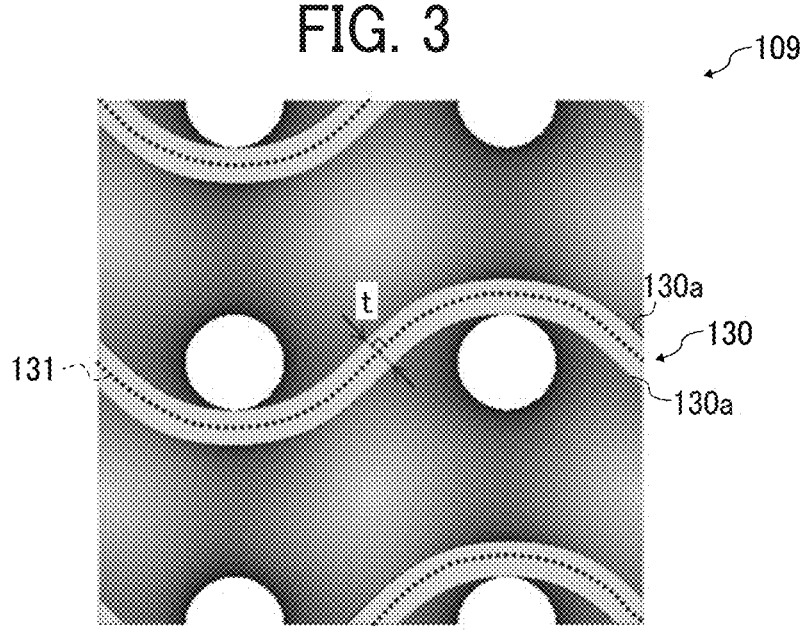
FIG. 3 is a plan view of a gyroid structure portion, illustrating a minimum thickness (wall thickness) of a wall.

As illustrated in FIG. 3, a gyroid structure component 109 includes a wall 130 that has wall surfaces 130a offset from the face 131 by ±t/2 on both sides of the face 131 in the normal direction of the face 131, respectively. Thus, the gyroid structure component 109 has a volume surrounded by the wall surfaces 130a. That is, the gyroid structure component 109 includes the wall 130 having a thickness t.

Figure 4:
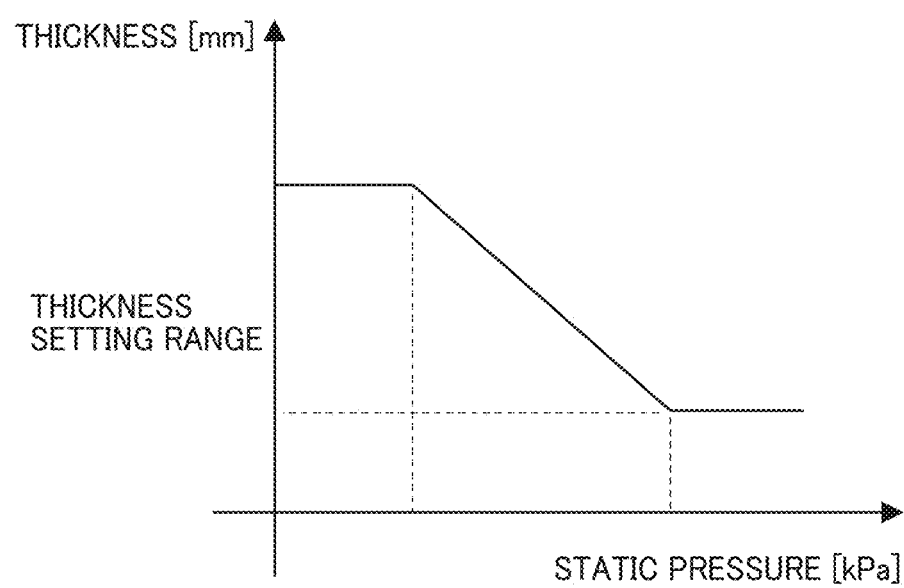
FIG. 4 is a graph illustrating a relation between a thickness of the wall and a static pressure.

The gyroid structure component according to an embodiment of the present disclosure includes the wall having a non-uniform thickness as described above, and can be used in various applications, but is preferably used in a heat exchanger and a heat sink as described below. The thickness of the wall of the gyroid structure component is set so as to correspond to a static pressure calculated under constant wall thickness (see FIG. 4).

Heat Exchanger

A heat exchanger according to an embodiment of the present disclosure includes the gyroid structure component having the gyroid structure portion described in the above embodiment. The heat exchanger transfers (exchanges) heat from a warm fluid to a cold fluid. Water or air is used as the fluid, for example. Examples of the heat exchanger include a heat sink, a radiator, and a boiler.

Heat Sink

A heat sink according to an embodiment of the present disclosure includes a channel including a gyroid structure portion having a non-uniform thickness.

Currently, electronic components such as semiconductors are highly integrated, causing high heat generation. Accordingly, a heat sink preferably has high cooling capacity without upsizing.

Since the heat sink according to the present embodiment is fabricated by a three-dimensional fabrication apparatus, the heat sink having a non-uniform gyroid structure portion can be fabricated to enhance the thermal performance greatly.

Examples of the fluid flowing through the channel of the heat sink include liquid, gas, and solid. Among these, the liquid is preferable. Examples of the liquid include water, ethylene glycol, and a mixture thereof. The viscosity of the liquid at 20° C. is preferably 1 to 100 mPa s.

In the present embodiment, at least a part of the wall has a gyroid structure portion and a non-uniform thickness. That is, the channel has a non-uniform cross-section in the gyroid structure portion. Compared with a gyroid structure portion with a uniform thickness, the gyroid structure portion with the non-uniform thickness can optimize the flow in the channel to achieve both a reduction in pressure loss and an enhancement in thermal performance. Further, the heat sink can be downsized.

The heat sink according to the present embodiment have a gyroid structure portion in which at least a part of the wall has a non-uniform thickness, and another part of the wall may have a uniform thickness as long as the object and effect of the present disclosure can be achieved.

In one aspect of the present disclosure, the gyroid structure component includes a gyroid structure portion including a wall having a non-uniform thickness. The wall defines a channel. In the uniform gyroid structure portion, for example, a large amount of liquid such as water flows to a portion where the liquid is likely to flow, causing variation in cooling performance. On the other hand, in the non-uniform gyroid structure portion, the wall at the portion where water is likely to flow is thicken to hinder the water from flowing, and the wall at the portion where water is less likely to flow is thinned to facilitate the water flowing. As a result, water flows uniformly in the entire gyroid structure portion, thereby uniformly cooling the side face of the heat sink.

In one aspect of the present disclosure, the wall has the minimum thickness that is preferably 1 mm or more, more preferably 1 mm or more and 15 mm or less, and still more preferably 3 mm or more and 10 mm or less. When the wall has the minimum thicknesses of 1 mm or more, water leakage from the heat sink and damage of the heat sink during manufacture can be prevented.

In one aspect of the present disclosure, a cell size of a unit cell forming the gyroid structure portion is preferably 5 mm or more, more preferably 5 mm or more and 15 mm or less, and still more preferably 8 mm or more and 12 mm or less. When the unit cell forming the gyroid structure portion has the cell size of 5 mm or more, powder can be easily removed from the gyroid structure portion when the heat sink is fabricated.

In one aspect of the present disclosure, a ratio of the cell size of the unit cell forming the gyroid structure portion to the maximum thickness of the wall (i.e., cell size/maximum thickness) is preferably 2.5 or more, more preferably 2.5 or more and 10 or less, and still more preferably 2.5 or more and 5 or less. When the ratio (cell size/maximum thickness) is 2.5 or more, powder can be easily removed from the gyroid structure portion when the heat sink is fabricated.

In one aspect of the present disclosure, the heat sink further includes a coupling portion. The coupling portion is a component attached to a water supply port and a water discharge port to be connected to a tube (pipe) to couple the heat sink to another device such as another heat sink. Since the pressure loss in the coupling portion may be large, the pressure loss can be reduced by integrating the coupling portion with a heat sink body.

The heat sink according to the present embodiment includes the heat sink body having the channel, and may further include other components if desired. The water supply port communicating with one end of the channel is disposed at one end of the heat sink body, and the water discharge port is disposed at the other end of the heat sink body.

liquid is supplied from the water supply port into the heat sink body, flows through the channel, and is discharged from the water discharge port to the outside of the heat sink body. The liquid may be circulated between the water supply port and the water discharge port. Examples of the liquid include water and the like. The water may contain an additive such as ethylene glycol.

Figure 5:
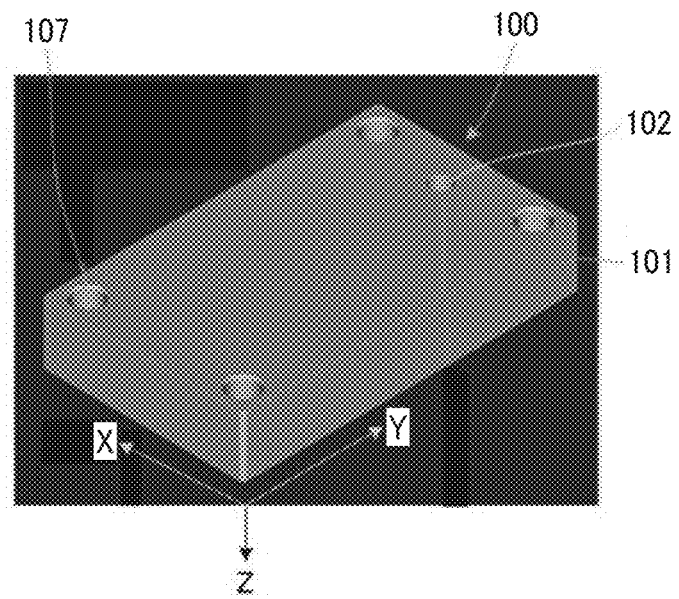
FIG. 5 is a schematic perspective view of a heat sink according to an embodiment of the present disclosure.
Figure 6:
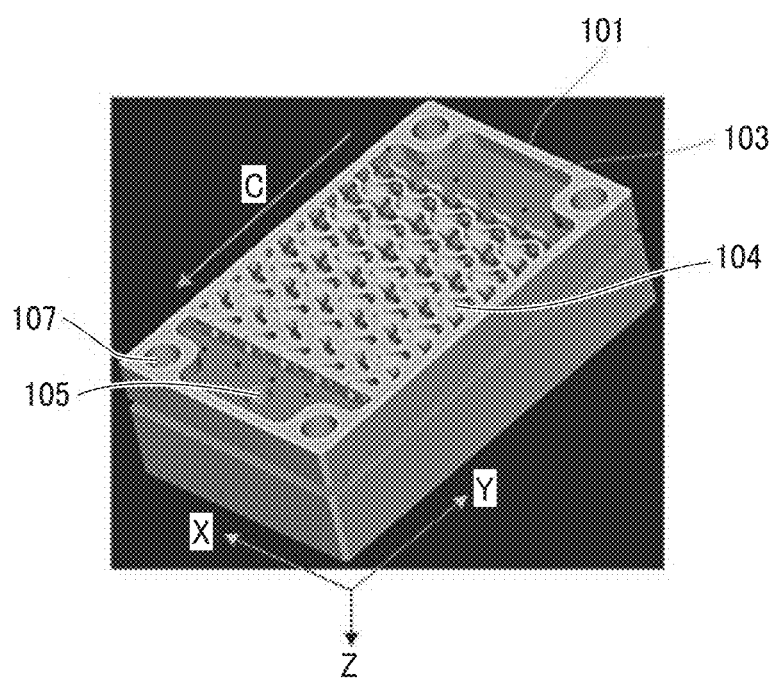
FIG. 6 is a schematic perspective view of the two heat sinks illustrated in FIG. 5 that are combined with each other by a coupling portion to form a single unit.

FIG. 5 is a schematic perspective view of a heat sink 100 according to the present embodiment, and FIG. 6 is a schematic perspective view of two heat sinks 100 illustrated in FIG. 5 combined and integrated by the coupling portion. In FIG. 6, the coupling portion is removed from the heat sink illustrated in FIG. 5.

The heat sink 100 illustrated in FIGS. 5 and 6 includes a heat sink body 101, a water supply port 102, a channel 103, a gyroid structure portion 104, a water discharge port 105, and holes 107 for assembly. A fluid enters the heat sink body 101 through the water supply port 102. The fluid flows in a channel direction indicated by arrow C (i.e., —Y direction in FIGS. 5 and 6) through the gyroid structure portion 104 in the channel 103. The fluid supplied from the water supply port 102 is discharged from the water discharge port 105.

For example, the water supply port 102 is located at one end of the heat sink 100 along the Y-axis and at a center of the heat sink 100 along the X-axis in FIGS. 5 and 6. The water discharge port 105 is located at the other end of the heat sink 100 along the Y-axis and at a center of the heat sink 100 along the X-axis in FIGS. 5 and 6. In addition, the fluid entering from the water supply port 102 flows from the center toward side faces of the heat sink 100 along the X-axis and also flows in a depth direction along the Z-axis in FIGS. 5 and 6. That is, the fluid flows from upstream to downstream of the heat sink 100.

In the heat sink 100, liquid is supplied from the water supply port 102 into the heat sink body 101, flows through the gyroid structure portion 104, which is expressed by Equation 1, in the channel 103, and is discharged from the water discharge port 105 to the outside of the heat sink body 101 (i.e., the liquid mainly flows in the direction indicated by arrow C in FIG. 6).

The liquid is heated by heat transferred from a heat generator, and is sent to a radiator by a pump. The heated liquid is cooled by an air cooling fan of the radiator, dissipates heat into the air, and is circulated back to the heat sink 100.

Methods of Manufacturing Heat Sink and Gyroid Structure Component

The method of manufacturing the heat sink according to the present embodiment includes laminating powder to form a powder layer and applying a fabrication liquid to the powder layer, and further includes other steps if desired.

The method of manufacturing the gyroid structure component according to the present embodiment includes laminating powder to form a powder layer and applying a fabrication liquid to the powder layer, and further includes other steps if desired.

In the method of manufacturing the heat sink and the method of manufacturing the gyroid structure component according to the present embodiment, a three-dimensional fabrication apparatus fabricates the heat sink and the gyroid structure component as a three-dimensional object.

Powder Layer Forming Step

In the powder layer forming step, powder is laminated to form a powder layer. The powder may include a base material, or may include a base material and an organic material. When the powder includes the base material (and does not include the organic material), the powder is preferably made of the base material. When the powder includes the base material and the organic material, the surface of the base material is preferably coated with the organic material.

Base Material

The base material is not particularly limited, and any material having a form of powder or particles can be suitably selected to suit to a particular application. Examples of the base material include metals, ceramics, carbon, polymers, woods, biocompatible materials, sand, and magnetic materials. To obtain a three-dimensional object having extremely high strength, metals, ceramics, and the like that can be finally subjected to a sintering treatment (step) are preferable.

The metal is not particularly limited as long as the material contains a metal. Examples of the metal includes magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), lead (Pb), silver (Ag), indium (In), tin (Sn), tantalum (Ta), tungsten (W), neodymium (Nd), and alloys of the metals described above. Among these metals, steel use stainless (SUS), iron (Fe), copper (Cu), silver (Ag), titanium (Ti), aluminum (Al), and alloys of the metals described above are suitably used. Examples of the aluminum alloy include AlSi10Mg, AlSi12, AlSi7Mg0.6, AlSi3Mg, AlSi9Cu3, SCALMALLOY, and ADC12. Each of these materials can be used alone or in combination with others. Among these materials, at least one selected from the group consisting of aluminum, zinc, magnesium, and alloys thereof is preferable.

Examples of the ceramics include oxides, carbides, nitrides, hydroxides, and the like. Examples of the oxides include, but are not limited to, metal oxides. Examples of the metal oxides include silica ($SiO_2$), alumina ($Al_2O_3$), zirconia ($ZrO_2$), titania ($TiO_2$), and the like. However, the above-described materials are only examples, and the present disclosure is not limited to the examples described above. Each of these materials can be used alone or in combination with others.

A commercially available product can be used for the base material. Examples of the commercially available product include pure Al (e.g., A1070-30BB manufactured by Toyo Aluminum K.K.), pure Ti (manufactured by OSAKA Titanium technologies Co., Ltd.), SUS316L (e.g., trade name PSS316L manufactured by Sanyo Special Steel Co., Ltd.), AlSi10Mg (e.g., Si10MgBB manufactured by Toyo Aluminum K.K.), $SiO_2$ (e.g., trade name EXCELICA SE-15K manufactured by Tokuyama Corporation), $Al_2O_3$ (e.g., trade name TAIMICRON TM-5D manufactured by TAIMEI CHEMICALS CO., LTD.), $ZrO_2$ (e.g., trade name TZ-B53 manufactured by Tosoh Corporation), and the like. The base material may be subjected to a surface treatment (surface modification treatment) to enhance adhesion to an organic material and to improve coating properties.

The volume average particle diameter of the base material is not particularly limited and can be suitably selected to suit to a particular application, but is preferably from 2 to 100 μm, more preferably from 8 to 50 μm. The volume average particle diameter of the base material of 2 μm or more can prevent an increase in an influence of aggregation and facilitate resin coating on the base material. Thus, the base material having the volume average particle diameter of 2 μm or more can prevent a reduction in yield, a reduction in production efficiency of the three-dimensional object, and deterioration of handleability of the base material. Further, the volume average particle diameter of the base material of 100 μm or less can prevent decrease in the number of contacts between the particles and prevent increase in voids. Thus, a decrease in a strength of the three-dimensional object and the sintered object thereof can be prevented.

A particle size distribution of the base material is not particularly limited and may be suitably selected to suit to a particular application. However, a shaper particle size distribution is preferable. The volume average particle diameter and the particle size distribution of the base material can be measured using a known particle size analyzer, and as one example, there is a particle size and distribution analyzer MICROTRAC MT 3000 II series (manufactured by MicrotracBEL Corp). The outer shape, surface area, circularity, fluidity, and wettability of the base material can be suitably selected to suit to a particular application.

The base material can be produced by a conventionally known method. As a method for producing a powder-shaped or particle-shaped base material, for example, there are pulverization in which a solid is fragmented by applying compression, impact, friction or the like, atomization in which a melted base material is sprayed and rapidly cooled to obtain a quenched powder, precipitation in which a component dissolved in a liquid is precipitated, and a gas-phase reaction in which the base material is vaporized and crystalized, and the like.

The base material is not limited by the production method, but the atomization is preferable because a spherical shape can be obtained and a variation in particle diameter is small. Examples of the atomization include water atomization, gas atomization, centrifugal atomization, plasma atomization, and the like, and any one of the methods described above is suitably used.

Organic Material

When the powder includes the base material and the organic material, any organic material can be used that has a reactive functional group, is soluble in a fabrication liquid, and can react with a cross-linker contained in the fabrication liquid to form a cross-linked structure by a covalent bond. The organic material having a solubility means that, for example, 90% by mass or more of the organic material is dissolved in the solvent when 1 g of the organic material is mixed with 100 g of the solvent included in the fabrication liquid at 30° C. and is stirred. Preferably, the organic material has low reactivity with powder of a highly active metal as the base material, is soluble in an organic solvent before being fabricated (solidified), and is insoluble in the organic solvent after being fabricated (solidified and cross-linked). More preferably, the organic material is soluble in an organic solvent having low solubility in water.

Powder in which the surface of the base material is coated with the organic material can prevent dust explosion of the powder even when the size of particles of the base material is small. When the organic material has low reactivity with powder of a highly active metal as the base material, is soluble in an organic solvent before the fabrication liquid is applied, and is insoluble in the organic solvent after the fabrication liquid is applied (after being cross-linked), the organic material can be used even if the base material is a highly active metal, that is, a water-prohibited material (for example, aluminum, titanium, and the like), and the solidified object (three-dimensional object) can be prevented from collapsing even when immersed in a solution including an organic solvent.

The reactive functional group is not particularly limited as long as the reactive functional group can react with a cross-linker to form a covalent bond, and can be suitably selected to suit to a particular application. Examples of the reactive functional group include a hydroxyl group, a carboxyl group, an amide group, a phosphate group, a thiol group, an acetoacetyl group, an ether linkage, and the like. Among these groups, the organic material preferably has a hydroxyl group in terms of enhancing the adhesion to the base material and the reactivity with the cross-linker. Preferably, 95% by mass or more of the organic material is pyrolyzed when the organic material alone is heated at 450° C. in order to prevent the organic material from remaining in the three-dimensional object and causing sintering inhibition during sintering.

As the organic material, a resin having a hydroxyl group is preferable. Examples of the resin include polyvinyl acetal (glass transition temperature (Tg): 107° C.), polyvinyl butyral (Tg: 67° C.), polyacrylic polyol (Tg: 80° C.), polyester polyol (Tg: 133° C.), polybutadiene polyol (Tg: —17° C.), ethyl cellulose (Tg: 145° C.), nitrocellulose (Tg: 50° C.), and the like. Examples of the resin further include partially saponified products of vinyl acetate copolymer (e.g., vinyl chloride-vinyl acetate copolymer and ethylene-vinyl acetate copolymer), polyether polyol, and phenolic polyol. Each of these resins can be used alone or in combination with others. Among these resins, polyacrylic polyol is preferable.

Among the organic materials, an organic material having a large number of hydroxyl groups not at the molecular ends but inside the molecule and having a weight average molecular weight and a hydroxyl value equal to or higher than certain values is preferable. The weight average molecular weight of the resin is preferably 100,000 or less, more preferably 2,000 or more and 100,000 or less. The organic material having the weight average molecular weight of 100,000 or less is preferably solid at room temperature. The hydroxyl value is preferably 50 mgKOH/g or more, and more preferably 100 mgKOH/g or more.

The organic material may be a commercially available product. Examples of commercially available products include polyacrylic polyol (ACRYDIC WFU 580 manufactured by DIC Corporation), polyester polyol (POLYLITE OD-X 668 manufactured by DIC Corporation, ADEKA NEW ACE YG-108 manufactured by ADEKA Corporation), polybutadiene polyol (GQ-1000 manufactured by Nippon Soda Co., Ltd.), polyvinyl butyral (MOWITAL B20H manufactured by Kuraray Co., Ltd.), polyvinyl acetal (S-LEC BM-2 and KS-1 manufactured by SEKISUI CHEMICAL CO., LTD.), ethyl cellulose (ETHOCEL manufactured by Nissin Chemical Co., Ltd.), and polyacrylic (OLYCOX KC-3000 manufactured by Kyoeisha Chemical Co., Ltd.).

The powder preferably includes the organic material and the base material, the surface of which is coated with the organic material. The average coating thickness of the organic material on the base material is preferably from 5 to 1,000 nm, more preferably from to 500 nm, even more preferably from 50 to 300 nm, and particularly preferably from 100 to 200 nm.

In the present embodiment, a cross-linking reaction by a cross-linker, which is utilized for coating, can reduce the coating thickness as compared with a normal coating, and both strength and accuracy of the coating can be achieved even in a thin film of the organic material.

When the average coating thickness is 5 nm or more, the solidified object formed of the powder (layer) to which the fabrication liquid is applied has a sufficient strength and does not lose shape thereof during sintering or handling. When the average coating thickness is 1,000 nm or less, the solidified object formed of the powder (layer) to which the fabrication liquid is applied has a high dimensional accuracy.

The average coating thickness can be obtained by, for example, embedding the powder in an acrylic resin, exposing the surface of the base material by etching, measuring the coating thickness at arbitrary 10 points using a scanning tunneling microscope (STM), an atomic force microscope (AFM), or a scanning electron microscope (SEM), and calculating the average of the measured values.

The ratio of the coating area of the organic material covering the surface of the base material to the surface area of the base material (i.e., a surface coverage) is not particularly limited if the surface coverage is sufficient to achieve the effects of the present disclosure. For example, the surface coverage is preferably 15% or more, more preferably 50% or more, particularly preferably 80% or more. When the surface coverage is 15% or more, the solidified object formed of the powder (layer) to which the fabrication liquid is applied has a sufficient strength and does not lose shape thereof during sintering or handling. Further, the solidified object has a high dimensional accuracy.

The surface coverage can be obtained by, for example, observing a photograph of the powder, measuring the ratio (%) of the coating area of the organic material to the total surface area of the particles of the powder for any 10 particles in the two-dimensional photograph, calculating the average of the measured values as the surface coverage. Alternatively, the surface coverage is obtained by elemental mapping of the coating area of the organic material by energy dispersive X-ray spectroscopy (EDS) such as SEM-EDS.

Other Components

The other components are not particularly limited and can be suitably selected to suit to a particular application. Examples thereof include a fluidizer, fillers, a leveling agent, sintering aids, and polymeric resin particles.

The fluidizer facilitates powder forming a layer efficiently. The fillers adhere to the surface of the powder, or voids among the powder is filled with the fillers. For example, there are effects of improving a fluidity of the powder, increasing the number of contacts between the particles of the powder, and reducing the voids between the particles of the powder. Thus, a strength and a dimensional accuracy of the three-dimensional object can be enhanced.

The leveling agent controls the wettability of the surface of the powder. The leveling agent has effects of increasing a permeability of the fabrication liquid into the powder, increasing the strength of the three-dimensional object and a speed of increasing the strength of the three-dimensional object, for example. Thus, the leveling agent can stably maintain the shape of the three-dimensional object.

The sintering aids improves sintering efficiency when sintering the obtained three-dimensional object. The sintering aid has an effect of enhancing the strength of the three-dimensional object, lowing the sintering temperature, and shortening the sintering time, for example.

A method of forming a thin layer of the powder (powder layer) on a support (fabrication stage) is not particularly limited and can be suitably selected to suit to a particular application. Suitable method can be used, such as, a method of forming the thin layer by a known counter rotation mechanism (e.g., a flattening roller), which is used in a selective laser sintering, a method of spreading the powder into a thin layer by a brush, a roller, or a blade, a method of pressing the surface of the powder by a pressing device to spread the powder into a thin layer, and a method using a known powder additive manufacturing apparatus.

A known three-dimensional fabrication apparatus may automatically and easily form a thin layer of the powder on the support. The three-dimensional fabrication apparatus typically includes a recoater (flattening roller) for laminating powder, a movable supply chamber for supplying the powder onto the support, and a movable fabrication chamber in which thin layers of the powder are laminated. In the powder additive manufacturing apparatus, the supply chamber is raised, the fabrication chamber is lowered, or both. As a result, the surface of the supply chamber can be constantly and slightly higher than the surface of the fabrication chamber. The recoater repeatedly moves to supply powder from the supply chamber to the fabrication chamber to laminate thin layers of the powder in the fabrication chamber.

The thickness of the powder layer is not particularly limited and can be suitably selected to suit to a particular application, but is preferably from 30 to 500 µm, more preferably from 60 to 300 µm. When the average thickness of the powder layer is 30 µm or more, the solidified object (sintering precursor) formed of the powder (layer) to which the fabrication liquid is applied has a sufficient strength and does not lose shape thereof during sintering or handling. When the average thickness of the powder layer is 500 µm or less, the solidified object formed of the powder (layer) to which the fabrication liquid is applied has a high dimensional accuracy. A method of measuring the average thickness of the powder layer is not particularly limited, and the thickness of the powder layer can be measured by a known method.

A powder layer forming means, such as the counter rotation mechanism, the brush, the blade, or the pressing device, places powder in a thin layer on the support as follows. For example, the counter rotation mechanism places powder in a thin layer on the support disposed in an outer frame (also referred to as the "fabrication chamber," a "mold," a "hollow cylinder," a "cylindrical structure," or the like). The support is movable up and down while sliding on an inner wall of the outer frame. At this time, when the support that is movable up and down in the outer frame is used, the support is disposed at a position slightly lower than the upper end opening of the outer frame. That is, the support is positioned lower than the top of the outer frame by the thickness of the powder layer to place powder on the support. Thus, the powder can be placed on the support in a thin layer.

Fabrication Liquid Applying Step

In the fabrication liquid applying step, a fabrication liquid is applied to the powder layer. The fabrication liquid used in the present embodiment is applied to the powder to solidify particles of the powder. When the powder includes the base material and the organic material (i.e., Case 1), the fabrication liquid contains a cross-linker, preferably contains an organic solvent and a surfactant, and further contains other components if desired. When the powder includes the base material and does not include the organic material (i.e., Case 2), the fabrication liquid contains the organic material, preferably contains a cross-linker, an organic solvent, and a surfactant, and further contains other components if desired.

In Case 1, when the fabrication liquid is applied to the organic material included in the powder, the organic material is dissolved by the organic solvent contained in the fabrication liquid and is cross-linked by the cross-linker contained in the fabrication liquid to solidify the powder. In Case 2, when the fabrication liquid is applied to the powder, the organic material contained in the fabrication liquid is precipitated by volatilization of the organic solvent to solidify the powder.

Organic Material

In Case 2, the organic material contained in the fabrication liquid is preferably a resin having a hydroxyl group from the viewpoint of adhesiveness at the interface between the metal as the base material and the organic material.

Examples of the resin having a hydroxyl group include polyvinyl acetal, polyvinyl butyral, polyacrylic polyol, polyester polyol, polybutadiene polyol, ethyl cellulose, nitrocellulose, polyvinyl pyrrolidone, partially saponified vinyl acetate copolymer (such as vinyl chloride-vinyl acetate copolymer and ethylene-vinyl acetate copolymer), polyether polyol, and phenolic polyol. Each of these resins can be used alone or in combination with others. The proportion of the organic material to the total amount of the fabrication liquid is preferably from 1% to 20% by mass, more preferably from 1% to 10% by mass.

Examples of the organic solvent include aliphatic hydrocarbon or aromatic hydrocarbon such as n-octane, m-xylene, and solvent naphtha; ketone such as diisobutyl ketone, 3-heptanone, and 2-octanone; ester such as butyl acetate, amyl acetate, n-hexyl acetate, n-octyl acetate, ethyl butyrate, ethyl valerate, ethyl caprylate, ethyl octanoate, ethyl acetoacetate, ethyl 3-ethoxypropionate, diethyl oxalate, diethyl malonate, diethyl succinate, diethyl adipate, bis(2-ethylhexyl) maleate, triacetin, tributyrin, and ethylene glycol monobutyl ether acetate; ether such as dibutyl ether, 1,2-dimethoxybenzene, and 1,4-dimethoxybenzene; dimethyl sulfoxide; and dihydroterpinyl acetate. Each of these materials can be used alone or in combination with others.

The organic solvent is not particularly limited, and compounds, not described herein, having a vapor pressure of 2,000 Pa or less at 25° C. and being insoluble or slightly soluble in water can be suitably selected as the organic solvent to suit to a particular application.

The proportion of the organic solvent to the total amount of the fabrication liquid is preferably from 30% to 90% by mass, more preferably from 50% to 80% by mass. When the proportion of the organic solvent is from 30% to 90% by mass, the solubility of the resin can be improved, and the three-dimensional object can be strengthened. The fabrication liquid including the above-described the organic solvent can prevent the nozzles from drying when the apparatus is not operating (on standby), thereby preventing nozzle clogging and nozzle missing.

Cross-Linker

In Case 1, the cross-linker forms a covalent bond with the reactive functional group of the organic material (resin) of the powder to form a cross-linked structure, thereby enhancing the strength of the solidified object and improving the solvent resistance of the solidified object. In Case 2, after the fabrication liquid is applied to the powder, the cross-linker is cross-linked by heat or ultraviolet rays, thereby enhancing the strength of the solidified object and improving the solvent resistance of the solidified object.

In the present disclosure, the "curing agent" is synonymous with the "cross-linker." The cross-linker is not particularly limited, and may be appropriately selected from isocyanate, acid anhydride, epoxy, and phenol aldehyde. The cross-linker preferably has two or more, and more preferably three or more, of any of the above compounds inside the molecule or at the molecular end.

Examples of isocyanate include, but are not limited to, diisocyanate, polyisocyanate, and the like. Examples of the diisocyanate include, but are not limited to: aromatic diisocyanate or polyisocyanate derived from aromatic such as tolylene diisocyanate (TDI), diphenylmethane diisocyanate (MDI), polymeric diphenylmethane diisocyanate (PMDI), tolidine diisocyanate (TODI), naphthalene diisocyanate (NDI), xylylene diisocyanate (XDI), and paraphenylene diisocyanate; aliphatic isocyanate such as isophorone diisocyanate (IPDI) and hexamethylene diisocyanate (HMDI); lysine diisocyanate (LDI); and tetramethylxylene diisocyanate (TMXDI). Each of these materials can be used alone or in combination with others. Examples of polyisocyanate include adducts of diisocyanate, isocyanurate, and allophanate.

Examples of the acid anhydride include acid dianhydride. Examples of acid dianhydride include pyromellitic anhydride, 3,4'-oxydiphthalic anhydride, 4,4'-oxydiphthalic anhydride, 4, 4-carbonyldiphthalic anhydride, bicyclo[2.2.2] oct-7-ene-2,3,5,6-tetracarboxylic dianhydride, diphenyl-3, 3',4,4'-tetracarboxylic dianhydride, diphenyl-2,3,3',4'-tetracarboxylic dianhydride, meso-butane-1,2,3,4-tetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 5-(2,5-dioxotetrahydrofuryl)-3-methyl-3-cyclohexene-1,2-dicarboxylic anhydride, 4-(2,5-dioxotetrahydrofuran-3-yl)-tetralin-1,2-dicarboxylic anhydride, 5,5'-(ethyne-1,2-diyl) bis(isobenzofuran-1,3-dione), 5,5'-(9H-fluorene-9,9-diyl) bis(2-benzofuran-1,3-dione), naphthalene-1,4,5,8-tetracarboxylic dianhydride, 4,4'-(4,4'-isopropylidenediphenoxy)bis(phthalic anhydride), 1,2,3,4-tetramethyl-1,2,3,4-cyclobutanetetracarboxylic dianhydride, octahydrobiphenylene-4a,8b:4b,8a-tetracarboxylic dianhydride, 1,4-Phenylene bis(1,3-dioxo-1,3-dihydroisobenzofuran-5-carboxylate), 3,4,9,10-perylenetetracarboxylic dianhydride, 4,4'-ethylenebis(2,6-morpholinedione), N,N-bis[2-(2,6-dioxomorpholino)ethyl] glycine, and the like. Each of these materials can be used alone or in combination with others.

Examples of the epoxy include diepoxide and polyepoxide. Examples of the diepoxide include aliphatic epoxy monomers such as 1,3-butadiene diepoxide, 1,5-hexadiene diepoxide, and 1, 7-octadiene diepoxide; epoxy monomers such as bisphenol A diglycidyl ether; and polyfunctional epoxy monomers such as triglycidyl isocyanurate and 4,4'-methylenebis(N,N-diglycidylaniline) Each of these materials can be used alone or in combination with others.

The proportion of the cross-linker to the total amount of the fabrication liquid is preferably from 1.0% to 50% by mass, more preferably from 10% to 30% by mass. When the proportion of the cross-linker is 1.0% by mass or more and 50% by mass or less, the obtained three-dimensional object can be prevented from being lacking strength, and an increase in viscosity, gelation, and a decrease in storage stability, and a decrease in viscosity stability of the fabrication liquid can be prevented.

Surfactant

A surfactant is preferably added in the fabrication liquid to adjust the surface tension or the like of the fabrication liquid. Examples of the surfactant include anionic surfactants, nonionic surfactants, amphoteric surfactants, acetylene glycol-based surfactants, fluorine-based surfactants, and silicone-based surfactants.

Physical Properties of Fabrication Liquid

The viscosity of the fabrication liquid at 25° C. is preferably 3 mPa s or more and 20 mPa s or less, more preferably 5 mPa s or more and 10 mPa s or less. When the viscosity is 3 mPa s or more and 20 mPa s or less, the fabrication liquid can be stably discharged from an inkjet nozzle, and the solidified object formed by applying the fabrication liquid to the powder layer has sufficient strength with good dimensional accuracy. The viscosity can be measured, for example, in accordance with Japanese Industrial Standards (JIS) K7117.

As the fabrication liquid acts on the powder placed in a thin layer in the powder layer forming step, the layer of the powder is solidified. Powder is placed in a thin layer on the obtained solidified thin layer in the same manner described above, and the fabrication liquid is applied to the powder (layer) placed in the thin layer to solidify the powder. At this time, the powder (layer) is solidified not only in the thin layer but also with the solidified object in the lower thin layer which is previously solidified. As a result, a solidified object having a thickness corresponding to about two layers of the powder (layer) placed in a thin layer is obtained.

A method of applying the fabrication liquid to the powder (layer) is not particularly limited and can be suitably selected to suit to a particular application. Examples of the method include a dispenser method, a spray method, and an inkjet method. A known apparatus can be suitably used as solidified object forming means to carry out the above methods.

Among these methods, the dispenser method has good quantitativeness of liquid droplets to be applied but has a small application area, and the spray method is capable of easily forming fine discharged liquid droplets, has a large application area, and has good application performance, but has poor quantitativeness of liquid droplets to be applied and causes powder to scatter by a spray flow. Accordingly, in the present embodiment, the inkjet method is particularly preferable. The inkjet method has better quantitativeness of liquid droplets than the spray method and has wider application area than the dispenser method. Thus, the inkjet method is preferable to efficiently form a complicated three-dimensional shape with high accuracy.

The solidified object forming means employing the inkjet method includes a liquid discharge head having a nozzle that applies the fabrication liquid to the powder layer by the inkjet method. A liquid discharge head (nozzle) in a known inkjet printer can be suitably used, and an inkjet printer can be suitably used as the solidified object forming means. Suitable examples of the inkjet printer include SG7100 manufactured by Ricoh Co., Ltd. The inkjet printer can discharge a large amount of the fabrication liquid at once from the liquid discharge head and apply the fabrication liquid in a wide area. Thus, inkjet printer is preferable to apply the fabrication liquid at high speed.

According to the present disclosure, the fabrication liquid does not contain solids such as particles or high-viscosity polymer materials such as resins. As a result, even when an inkjet printer that can apply the fabrication liquid with high accuracy and efficiency is used, the nozzle and a portion in the liquid discharge head are not clogged with the fabrication liquid and are not corroded by the fabrication liquid. Further, when applied (discharged) to a powder layer, the fabrication liquid can efficiently permeate organic materials in the powder. Accordingly, a three-dimensional object can be fabricated with high manufacturing efficiency. Furthermore, since polymer component such as resins is not applied to the powder layer, the solidified object can be easily and efficiently fabricated in a short time with good dimensional accuracy and without unexpectedly increasing the volume thereof.

Other Steps

Examples of other steps include a powder removal step, a sintering step, a surface protection treatment step, and a coating step.

Powder Removal Step

In the powder removal step, powder adhering to the solidified object is removed from the solidified object. As a method of removing powder adhering to the solidified object from the solidified object, a method of immersing the solidified object in a powder removing liquid is preferable. The powder removing liquid does not dissolve (does not soften) the solidified object and dissolves the organic material in the powder. As the solidified object is immersed in the powder removing liquid, surplus powder adhering to the surface or the inside of the solidified object can be removed.

That is, by immersing the solidified object in the powder removing liquid, a solidified portion of the powder to which the fabrication liquid has been applied is not dissolved (not softened), and an unsolidified portion of the powder to which the fabrication liquid is not applied is dissolved.

After the fabrication liquid is applied to powder (powder layer), a three-dimensional object (green body), in which the solidified objects are laminated, is buried in the unsolidified portion of the powder (i.e., unsolidified powder) to which the fabrication liquid is not applied. When the buried green body is taken out from the unsolidified powder, surplus (unsolidified) powder adheres to the surface and the internal structure of the green body, and it is difficult to easily remove the surplus powder. It is even more difficult to remove the surplus powder when the surface of the green body has complicated irregularities or when the green body has the internal structure such as a channel. In the typical binder jetting, the strength of the green body is not high, and thus the green body may collapse when the pressure of air blow is high (e.g., 0.3 MPa or more).

In the three-dimensional object (green body), the solidified objects formed of the powder and the fabrication liquid according to the present embodiment are laminated. The green body has a strength sufficient to withstand the pressure of air blow when the organic material covering the base material is dissolved and solidified by the compound, which develops a reactive group by heating, contained in the fabrication liquid.

The powder removing liquid contains an organic solvent, and further contains other components if desired. The organic solvent, which does not dissolve the solidified object and dissolves the organic material in the powder, contained in the powder removing liquid is not particularly limited and can be suitably selected to suit to a particular application. At least one selected from the group consisting of ketone, halogen, alcohol, ester, ether, hydrocarbon, glycol, glycol ether, glycol ester, pyrrolidone, amide, amine, and carbonic acid ester may be used. As other components, additives such as a surfactant, a defoamer, a preservative, a fungicide, a pH adjuster, a chelator, and an antirust can be further added in the powder removing liquid if desired.

Drying Step

In the drying step, the three-dimensional object (green body) in which the solidified objects obtained in the fabrication liquid applying step are laminated is dried. In the drying step, not only moisture contained in the green body is removed but also the organic materials may be removed (degreased). Examples of the drying means include a known dryer and constant temperature and humidity chamber.

Sintering Step

In the sintering step, the three-dimensional object (green body) in which the solidified objects obtained in the fabrication liquid applying step are laminated is sintered. By performing the sintering step, the green body can be formed into a densified and integrated metal or ceramic object (sintered body of the three-dimensional object). Examples of the sintering means include a known sintering furnace.

Surface Protection Treatment Step

In the surface protection treatment step, a protective layer is formed on the three-dimensional object (green body) in which the solidified objects obtained in the fabrication liquid applying step are laminated. By performing the surface protection treatment step, the solidified object can have a durable surface such that the solidified object can be used as is, for example. Specific examples of the protective layer include a water-resistant layer, a weather-resistant layer, a light-resistant layer, a heat-insulating layer, and a glossy layer. Examples of the surface protection treatment means include known surface protection treatment apparatuses such as a spray apparatus and a coating apparatus.

Coating Step

In the coating step, the three-dimensional object (green body) in which the solidified objects obtained in the fabrication liquid applying step are laminated is coated. By performing the coating step, the green body can be colored in a desired color. Examples of the coating means include known coating devices such as a spray coating device, a roller coating device, and a brush coating device.

Figure 7:
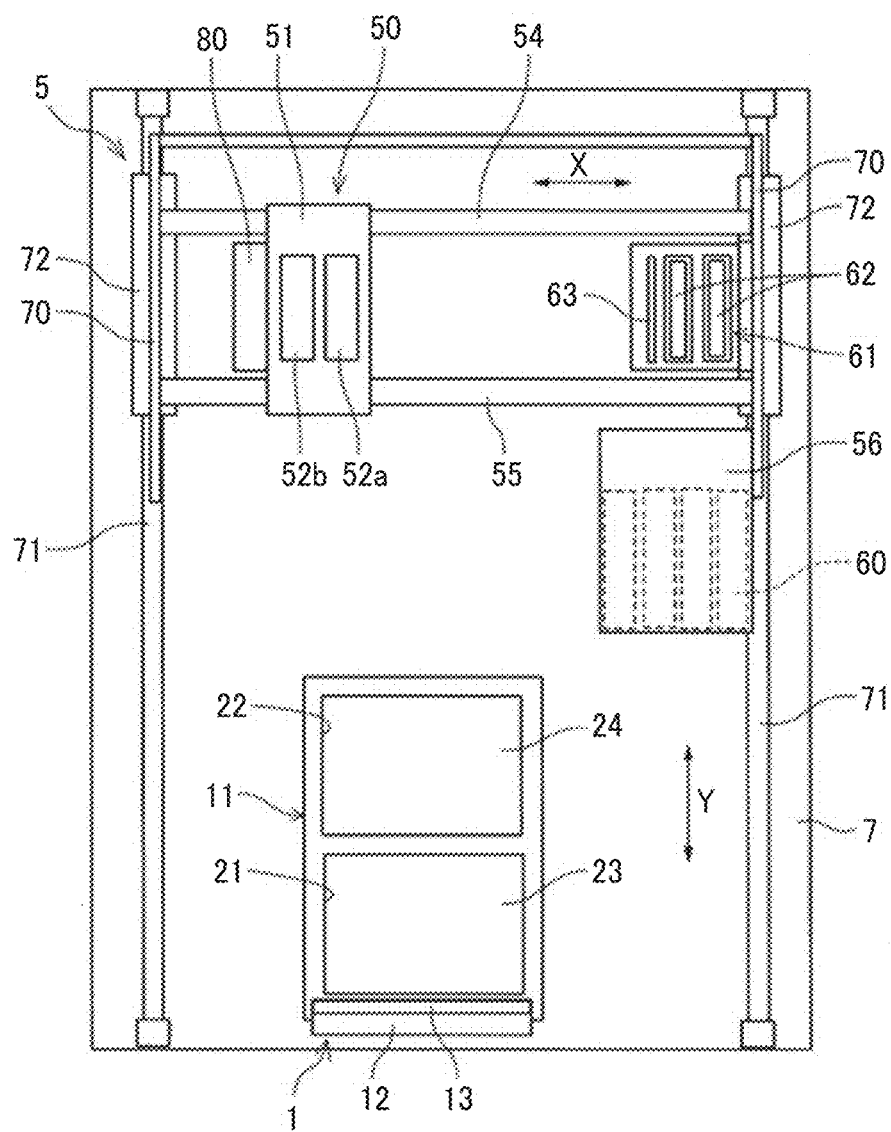
FIG. 7 is a schematic plan view of a three-dimensional fabrication apparatus to manufacture the heat sink or a gyroid structure component according to embodiments of the present disclosure.
Figure 8:
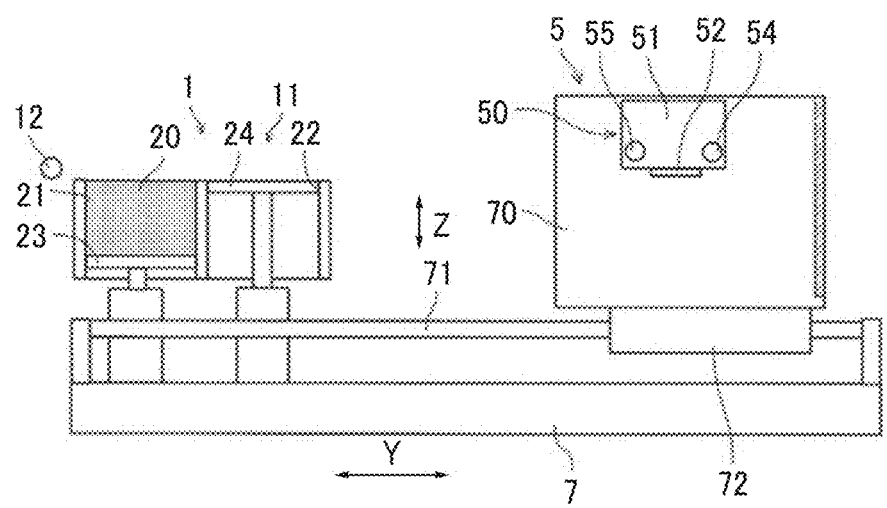
FIG. 8 is a schematic side view of the three-dimensional fabrication apparatus to manufacture the heat sink or the gyroid structure component according to embodiments of the present disclosure.
Figure 9:
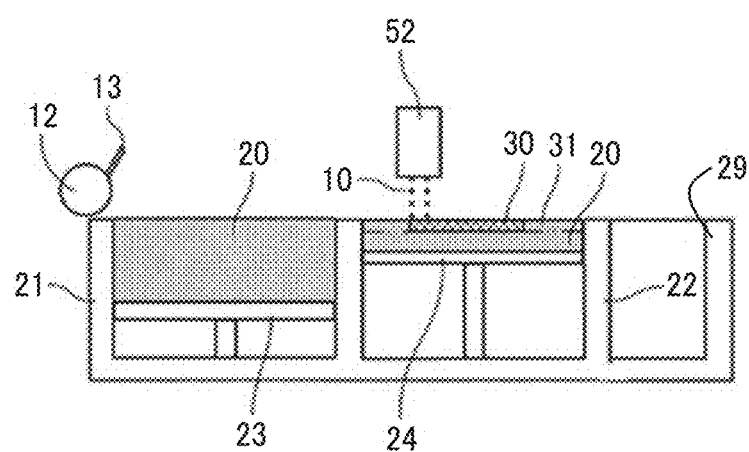
FIG. 9 is a schematic cross-sectional view of a fabrication section of the three-dimensional fabrication apparatus to manufacture the heat sink or the gyroid structure component according to embodiments of the present disclosure.
Figure 10:
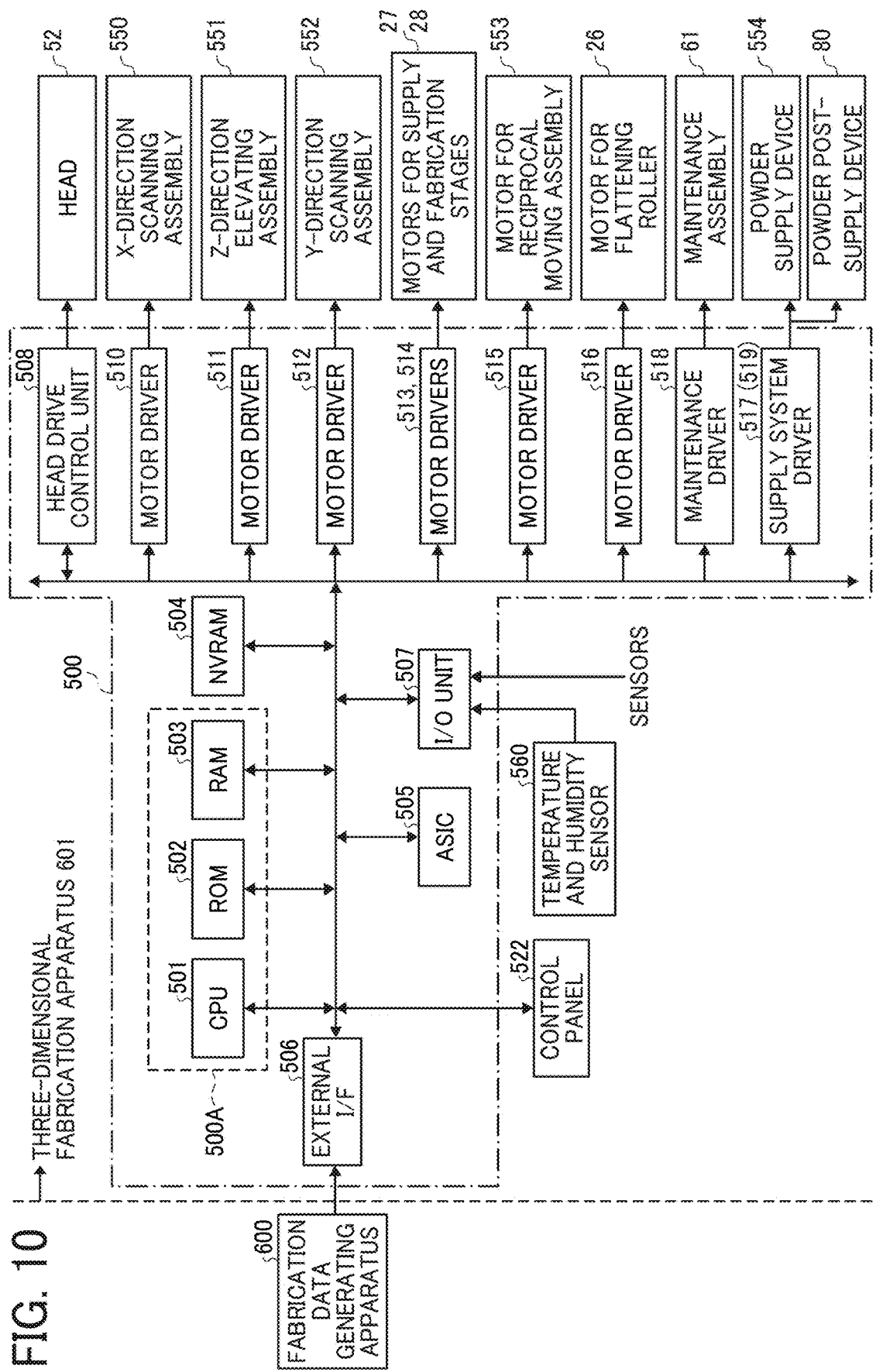
FIG. 10 is a block diagram of a controller of the three-dimensional fabrication apparatus to manufacture the heat sink or the gyroid structure component according to embodiments of the present disclosure.
Figure 11:
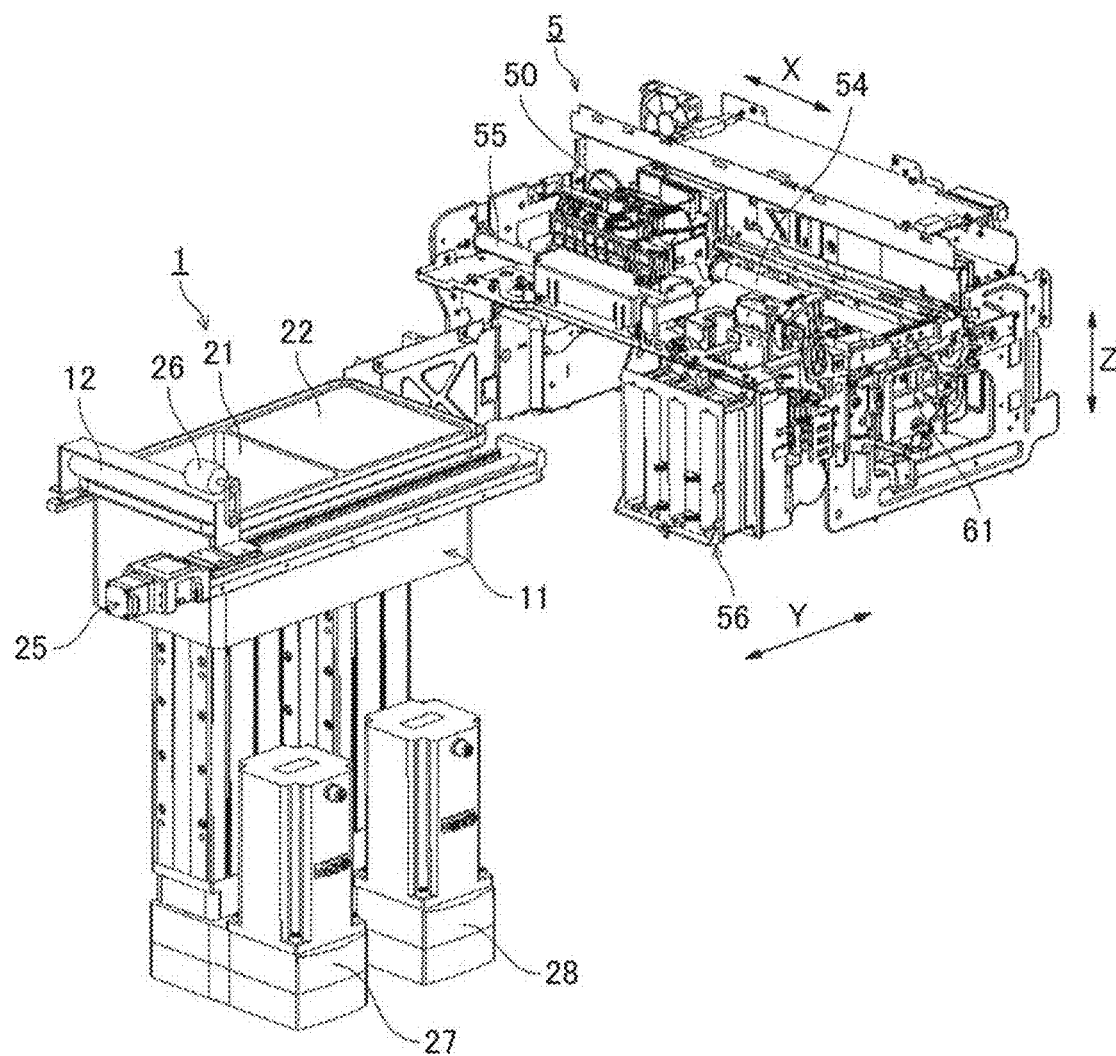
FIG. 11 is an external perspective view of the entire three-dimensional fabrication apparatus to manufacture the heat sink or the gyroid structure component according to embodiments of the present disclosure.

Embodiments of the present disclosure are described in detail below with reference to the drawings. FIG. 7 is a schematic plan view of a three-dimensional fabrication apparatus to manufacture the heat sink or the gyroid structure component according to an embodiment of the present disclosure. FIG. 8 is a schematic side view of the three-dimensional fabrication apparatus in FIG. 7 to manufacture the heat sink or the gyroid structure component. FIG. 9 is a schematic cross-sectional view of a fabrication unit of the three-dimensional fabrication apparatus to manufacture the heat sink or the gyroid structure component. FIG. 10 is a block diagram of a controller of the three-dimensional fabrication apparatus to manufacture the heat sink or the gyroid structure component. FIG. 11 is an external perspective view of the entire three-dimensional fabrication apparatus to manufacture the heat sink or the gyroid structure component.

The three-dimensional fabrication apparatus used in the method of manufacturing the heat sink or the method of manufacturing the gyroid structure component according to the present embodiments includes a fabrication section 1 and a fabrication unit 5. A fabrication layer 30 (see FIG. 9), which is a layered structure formed of bonded powder, is formed in the fabrication section 1. The fabrication unit 5 discharges a fabrication liquid 10 (see FIG. 9) to a powder layer 31 (see FIG. 9) spread in a layer in the fabrication section 1 to fabricate a three-dimensional object (e.g., the heat sink or the gyroid structure component). The fabrication section 1 includes a powder chamber 11 and a flattening roller 12.

The flattening roller 12 is a rotator serving as a flattening member. Note that the flattening member may be, for example, a plate member (blade) instead of the rotator. The powder chamber 11 includes a supply chamber 21, a fabrication chamber 22, and a surplus powder receiving chamber 29 (see FIG. 9). The supply chamber 21 stores powder 20 (see FIG. 8) to be supplied to the fabrication chamber 22. Fabrication layers 30 are laminated in the fabrication chamber 22 to fabricate a three-dimensional object.

The bottom portion of the supply chamber 21 is movable in a vertical direction (height direction) as a supply stage 23. Similarly, the bottom portion of the fabrication chamber 22 is movable in the vertical direction (height direction) as a fabrication stage 24. Fabrication layers 30 are laminated on the fabrication stage 24, and a three-dimensional object including the fabrication layers 30 is fabricated on the fabrication stage 24. As illustrated in FIG. 11, a motor 27 moves the supply stage 23 upward and downward in the Z direction (height direction) indicated by arrow Z. Likewise, a motor 28 moves the fabrication stage 24 upward and downward in the Z direction.

The flattening roller 12 transfers and supplies the powder 20 supplied onto the supply stage 23 in the supply chamber 21 to the fabrication chamber 22. The flattening roller 12 evens and flattens the surface of the powder 20 supplied to the fabrication chamber 22, to form the powder layer 31. A blade 13 contacts the flattening roller 12 as illustrated in FIGS. 7 and 9 to scrape off powder adhering the flattening roller 12. A reciprocal moving assembly 25 (see FIG. 11) reciprocally moves the flattening roller 12 in the Y direction indicated by arrow Y along a stage surface (a surface on which the powder 20 is loaded) of the fabrication stage 24. The flattening roller 12 is rotationally driven by a motor 26.

The fabrication unit 5 includes a liquid discharge unit 50 that discharges (applies) the fabrication liquid 10 for binding the powder 20 to the powder layer 31 on the fabrication stage 24 to form the fabrication layer 30 as a layered structure in which the powder 20 is bound. The liquid discharge unit 50 includes a carriage 51 and two liquid discharge heads 52a and 52b (hereinafter referred to as simply "head(s) 52" unless distinguished) mounted on the carriage 51. In FIG. 7, the two heads 52 are illustrated. However, in other embodiments, the number of the heads 52 may be one, or three or more. The carriage 51 is movably held by guides 54 and 55. The guides 54 and 55 are held by side plates 70 on both sides so as to be movable up and down.

An X-direction scanning assembly 550 (see FIG. 10) described later reciprocally moves the carriage 51 in the X direction indicated by arrow X in FIG. 7 with an X-direction scanning motor via a pulley, and a belt. The X direction indicated by arrow X is the same as the main scanning direction. Hereinafter, the X direction indicated by arrow X is simply referred to as the "X direction," and the same applies to the Y direction and the Z direction.

Each of the two heads 52a and 52b includes two nozzle rows in each of which a plurality of nozzles is arranged to discharge liquid. Two nozzle rows of one head 52a discharge, for example, cyan fabrication liquid and magenta fabrication liquid. Two nozzle rows of the other head 52b discharge, for example, yellow fabrication liquid and black fabrication liquid. Note that the configuration of the head 52 is not limited to the above-described configuration. A plurality of tanks 60 is mounted on a tank mount 56 and stores the cyan fabrication liquid, the magenta fabrication liquid, the yellow fabrication liquid, and the black fabrication liquid, respectively. The cyan, magenta, yellow, and black fabrication liquids are supplied to the heads 52a and 52b via supply tubes.

A maintenance assembly 61 for maintaining and recovering the heads 52 of the liquid discharge unit 50 is disposed on one side (right side in FIG. 7) in the X direction.

The maintenance assembly 61 includes caps 62 and a wiper 63. The caps 62 are brought into close contact with the nozzle surface (a surface on which the nozzles are arranged) of the head 52, and suck the fabrication liquid 10 from the nozzles to discharge high-viscosity fabrication liquid 10 and powder 20 blocking the nozzles. Then, the wiper 63 wipes the nozzle surface to form meniscus of the fabrication liquid 10 in the nozzles, in which the pressure is negative. When the fabrication liquid 10 is not discharged, the maintenance assembly 61 covers the nozzle surfaces of the heads 52 with the caps 62 to prevent powder 20 from entering the nozzles and to prevent the fabrication liquid 10 from drying.

The fabrication unit 5 includes a slider 72 slidably supported by a guide 71 disposed above a base 7. The entire fabrication unit 5 is reciprocally movable in the Y direction (sub-scanning direction) perpendicular to the X direction. A Y-direction scanning assembly 552 (see FIG. 10) described later reciprocally moves the entire fabrication unit 5 in the Y direction. The liquid discharge unit 50 is movable upward and downward in the Z direction together with the guides 54 and 55. A Z-direction elevating assembly 551 (see FIG. 10) described later raises and lowers the liquid discharge unit 50 in the Z direction.

A specific configuration of the fabrication section 1 is further described below. The powder chamber 11 has a box shape and includes three open-topped chambers, the supply chamber 21, the fabrication chamber 22, and the surplus powder receiving chamber 29. The supply stage 23 is vertically movable inside the supply chamber 21, and the fabrication stage 24 is vertically movable inside the fabrication chamber 22. Side faces of the supply stage 23 contact inner side faces of the supply chamber 21. Side faces of the fabrication stage 24 contact inner side faces of the fabrication chamber 22. The upper surfaces of the supply stage 23 and the fabrication stage 24 are kept horizontal.

A powder supply device 554 (see FIG. 10) described later is disposed above the supply chamber 21. The powder supply device 554 supplies powder 20 in a tank of the powder supply device 554 to the supply chamber 21 at the time of an initial operation of a fabrication process or when an amount of the powder 20 in the supply chamber 21 decreases. Examples of a method of a powder conveyance for supplying the powder 20 include a screw conveyor system using a screw and an air conveyance system using air.

The flattening roller 12 transfers and supplies powder 20 from the supply chamber 21 to the fabrication chamber 22 and smooths and flattens the surface of the powder 20 to form the powder layer 31 which is a layered powder having a desired thickness. The flattening roller 12 has a rod shape longer than an inside dimension of the fabrication chamber 22 and the supply chamber 21 (that is, a width of a portion to which the powder 20 is supplied or stored). The reciprocal moving assembly 25 reciprocally moves the flattening roller 12 above the supply chamber 21 and the fabrication chamber 22 in the Y direction (sub-scanning direction) along the stage surface. The flattening roller 12 horizontally moves forward and backward so as to pass through an area above the supply chamber 21 and the fabrication chamber 22 while being rotated by the motor 26. Accordingly, the powder 20 is transferred and supplied into the fabrication chamber 22, and the flattening roller 12 flattens the powder while passing over the fabrication chamber 22, thus forming the powder layer 31.

Next, an outline of a controller of the three-dimensional fabrication apparatus used in the method of manufacturing the heat sink or the method of manufacturing the gyroid structure component according to the present embodiments is described with reference to FIG. 10. FIG. 10 is a block diagram of a controller 500 of a three-dimensional fabrication apparatus (powder additive manufacturing apparatus) 601 according to the embodiments of the present disclosure.

The controller 500 includes a main controller 500A including a central processing unit (CPU) 501, a read only memory (ROM) 502, and a random access memory (RAM) 503. The CPU 501 controls the entire system of the three-dimensional fabrication apparatus 601. The ROM 502 stores programs, which include a program to cause the CPU 501 to perform the control, including controls according to the embodiments of the present disclosure, of fabricating a three-dimensional object, and other fixed data. The RAM 503 temporarily stores fabrication data and the like.

The controller 500 further includes a nonvolatile RAM (NVRAM) 504 that retains data while the apparatus is powered off. The controller 500 further includes an application specific integrated circuit (ASIC) 505 to perform image processing in which various signals are processed on image data and processing of input and output signals for controlling the entire apparatus.

The controller 500 further includes an external interface (I/F) 506 to send and receive data and signals when the controller 500 receives fabrication data from a fabrication data generating apparatus 600 (an external device). The fabrication data generating apparatus 600 generates fabrication data in which a final-form object (three-dimensional object) is sliced in multiple fabrication layers. The fabrication data generating apparatus 600 includes a data processor such as a personal computer.

The controller 500 further includes an input-output (I/O) unit 507 to receive detection signals of various sensors. The controller 500 further includes a head drive control unit 508 to control driving of the head 52 of the liquid discharge unit 50.

The controller 500 further includes a motor driver 510 that drives a motor included in the X-direction scanning assembly 550 and a motor driver 512 that drives a motor included in the Y-direction scanning assembly 552. The X-direction scanning assembly 550 moves the carriage 51 of the liquid discharge unit 50 in the X direction (main scanning direction). The Y-direction scanning assembly 552 moves the fabrication unit 5 in the Y direction (sub-scanning direction).

The controller 500 further includes a motor driver 511 that drives a motor included in the Z-direction elevating assembly 551. The Z-direction elevating assembly 551 moves (raises and lowers) the carriage 51 of the liquid discharge unit 50 in the Z direction. The Z-direction elevating assembly 551 may move (raises and lowers) the entire fabrication unit 5 in the Z-direction.

The controller 500 further includes a motor driver 513 that drives the motor 27 for raising and lowering the supply stage 23 and a motor driver 514 that drives the motor 28 for raising and lowering the fabrication stage 24. The controller 500 further includes a motor driver 515 that drives a motor 553 of the reciprocal moving assembly 25 for moving the flattening roller 12 and a motor driver 516 that drives the motor 26 for rotating the flattening roller 12.

The controller 500 further includes a supply system driver 517 that drives the powder supply device 554 to supply powder 20 to the supply chamber 21 and a maintenance driver 518 that drives the maintenance assembly 61 of the liquid discharge unit 50. The supply system driver 517 also drives the powder post-supply device 80 to supply the powder 20 to the powder chamber 11. Alternatively, the controller 500 may include another supply system driver 519 that drives the powder post-supply device 80 to supply the powder 20.

A temperature and humidity sensor 560 detects the temperature and the humidity as the environment condition of the apparatus. The detected signals of the temperature and humidity sensor 560 and detected signals of other sensors are input into the I/O unit 507 of the controller 500. The controller 500 is connected to a control panel 522 to input and display data necessary for the apparatus.

The fabrication data generating apparatus 600 and the three-dimensional fabrication apparatus (powder additive manufacturing apparatus) 601 construct a three-dimensional fabrication system.

Next, operations of the three-dimensional fabrication apparatus used in the method of manufacturing the heat sink or the method of manufacturing the gyroid structure component according to the embodiments of the present disclosure is described with reference to FIGS. 12A to 12E. FIGS. 12A to 12E are schematic views of the fabrication section 1, illustrating of the flow of fabrication steps. The following description starts from a state in which a first fabrication layer 30 has been formed on the fabrication stage 24 of the fabrication chamber 22.

Figure 12A:
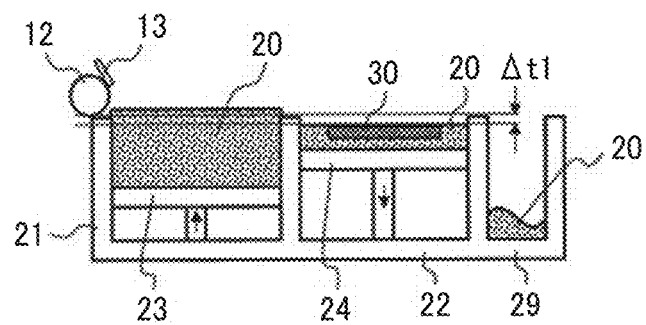
FIG. 12A is a schematic view of the fabrication section of the three-dimensional fabrication apparatus to manufacture the heat sink or the gyroid structure component according to embodiments of the present disclosure, illustrating an operation of the three-dimensional fabrication apparatus.

When a second fabrication layer 30 is formed on the first fabrication layer 30, as illustrated in FIG. 12A, the supply stage 23 of the supply chamber 21 is raised, and the fabrication stage 24 of the fabrication chamber 22 is lowered. At this time, a lowering distance of the fabrication stage 24 is set so that a distance (i.e., a lamination pitch) between an upper surface of the powder layer 31 in the fabrication chamber 22 (surface of powder 20) and a lower end of the flattening roller 12 (lower tangential portion) becomes $\Delta t1$. The distance (thickness) $\Delta t1$ is not particularly limited, and is preferably about several tens μm to about 100 μm.

Figure 12B:
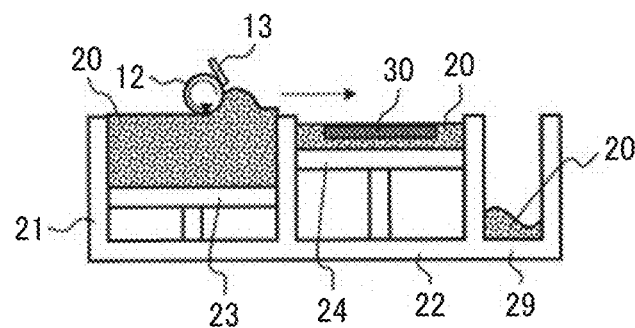
FIG. 12B is a schematic view of the fabrication section of the three-dimensional fabrication apparatus to manufacture the heat sink or the gyroid structure component according to embodiments of the present disclosure, illustrating another operation of the three-dimensional fabrication apparatus.

Next, as illustrated in FIG. 12B, the flattening roller 12 moves toward the fabrication chamber 22 while rotating in the counter direction as indicated by arrows in FIG. 12B (i.e., counterclockwise in FIG. 12B) to transfer and supply powder 20 upper than the level of an upper surface of the supply chamber 21 to the fabrication chamber 22 (powder supply step).

Figure 12C:
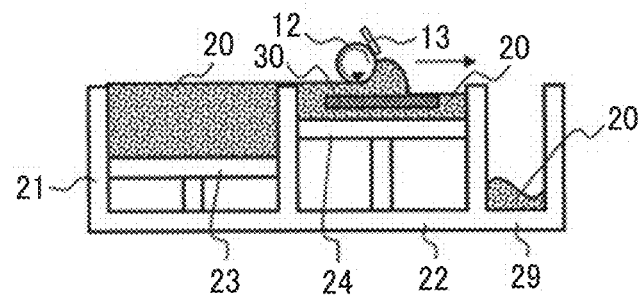
FIG. 12C is a schematic view of the fabrication section of the three-dimensional fabrication apparatus to manufacture the heat sink or the gyroid structure component according to embodiments of the present disclosure, illustrating still another operation of the three-dimensional fabrication apparatus.

Next, as illustrated in FIG. 12C, the flattening roller 12 moves in parallel to the stage surface of the fabrication stage 24 of the fabrication chamber 22 (flattening step). As a result, a powder layer 31 having a predetermined distance (thickness) $\Delta t1$ is formed on the fabrication stage 24 of the fabrication chamber 22 as illustrated in FIG. 7D. At this time, the surplus powder 20 not used for forming the powder layer 31 falls into the surplus powder receiving chamber 29.

Figure 12D:
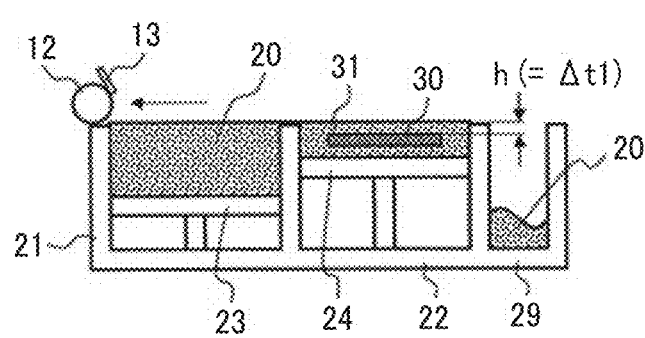
FIG. 12D is a schematic view of the fabrication section of the three-dimensional fabrication apparatus to manufacture the heat sink or the gyroid structure component according to embodiments of the present disclosure, illustrating yet another operation of the three-dimensional fabrication apparatus.
Figure 12E:
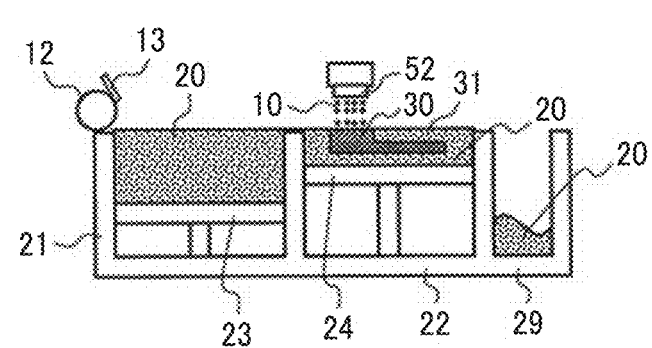
FIG. 12E is a schematic view of the fabrication section of the three-dimensional fabrication apparatus to manufacture the heat sink or the gyroid structure component according to embodiments of the present disclosure, illustrating still yet another operation of the three-dimensional fabrication apparatus.

After forming the powder layer 31, the flattening roller 12 moves toward the supply chamber 21 as illustrated in FIG. 12D and returned to an initial position (original position) (returning step). Then, as illustrated in FIG. 12E, the heads 52 of the liquid discharge unit 50 discharges droplets of the fabrication liquid 10 to form and laminate the next fabrication layer 30 in the powder layer 31.

Next, the formation of the powder layer 31 and the discharge of the fabrication liquid described above are repeated to form a new fabrication layer 30. At this time, the newly-formed upper fabrication layer 30 and the preceding lower fabrication layer 30 are united to form a part of the solidified object. Thereafter, the formation of the powder layer 31 and the discharge of the fabrication liquid 10 are repeated to complete the fabrication of the solidified object (green body).

EMBODIMENTS

Embodiments according to the present disclosure are described below. However, the present disclosure is not intended to be limited to the embodiments described herein.

Comparative Example 1

Manufacturing of Heat Sink

Figure 13:
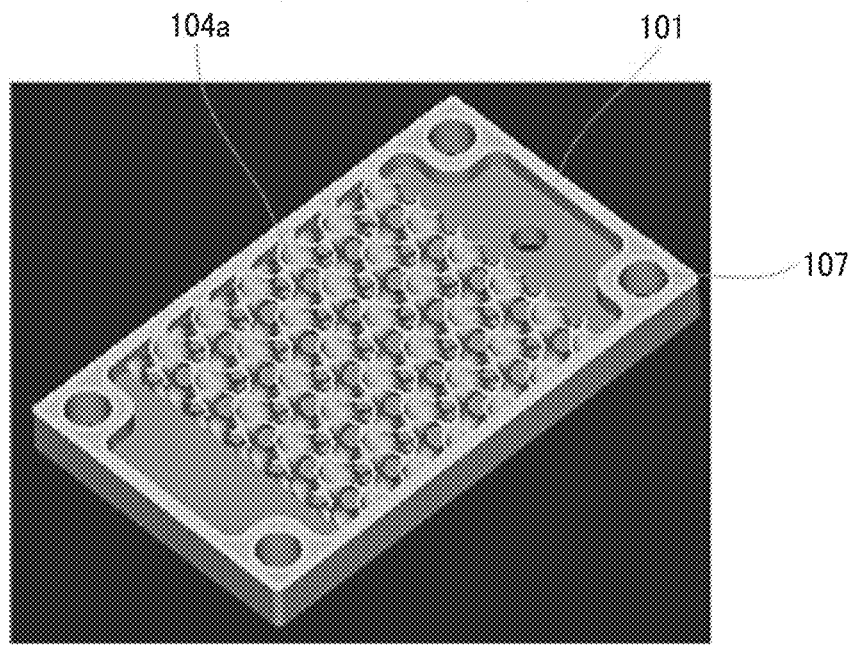
FIG. 13 is a schematic perspective view illustrating a heat sink according to Comparative Example 1.
Figure 14A:
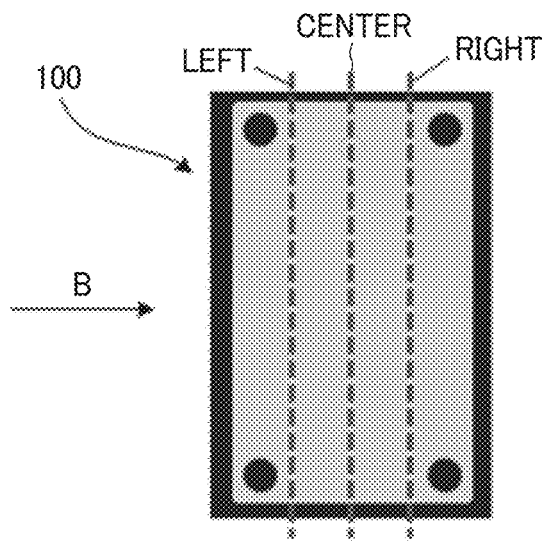
FIG. 14A is a diagram illustrating left, center, and right cross-sectional positions of the heat sink according to Comparative Example 1.

FIG. 13 is a schematic perspective view of a heat sink body 101 according to Comparative Example 1. FIG. 14A is a diagram illustrating left, center, and right cross-sectional positions of a heat sink according to Comparative Example 1. FIGS. 14BA to 14BC are cross-sectional views of the heat sink according to Comparative Example 1 at the left, center, and right cross-sectional positions as viewed in the direction indicated by arrow B in FIG. 14A, respectively.

The heat sink according to Comparative Example 1 illustrated in FIG. 13 has the following dimensions, and includes a wall having a gyroid structure portion 104a expressed by the following Equation 1:

$$\sin(X \times P1)\cos(Y \times P2)+\sin(Y \times P2)\cos(Z \times P3)+\sin(Z \times P3)\cos(X \times P1)=0 \qquad \text{Equation 1,}$$

where X, Y, and Z are real numbers ranging from $-\pi$ to $\pi$, and P1, P2, and P3 are real numbers greater than 0.

As illustrated in FIG. 14A and FIGS. 14BA to 14BC, the wall in the gyroid structure portion 104a expressed by Equation 1 is uniformly thick from left to right and from top to bottom (from the water supply port 102 to the water discharge port 105) in the drawings. That is, the wall in the gyroid structure portion 104a has uniform thickness in the entire heat sink.

Figure 16:
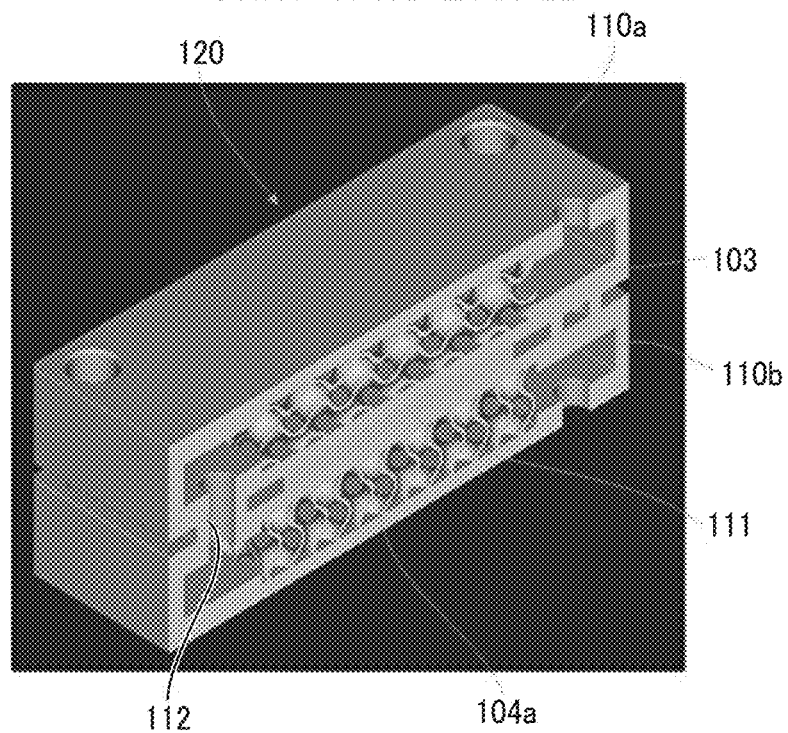
FIG. 16 is a schematic cross-sectional view of the heat sink model illustrated in FIG. at the center thereof.

Heat Sink Dimensions
  Outer shape: 100 mm×60 mm×18 mm
  Gyroid structure portion: 60 mm×54 mm×12 mm
  Hole diameters of the inlet and outlet of coolant: 6 mm
Preparation of Heat Sink Model As illustrated in FIG. 15, two heat sinks (a first heat sink 110a and a second heat sink 110b) according to Comparative Example 1 were stacked, and a coupling portion 112 (see FIG. 16) between the two heat sinks was used as a flow path having a diameter of 6 mm As illustrated in FIG. 16, a heat source 111 was disposed between the first heat sink 110a and the second heat sink 110b. The heat source 111 has dimensions of 50 mm×44 mm×3 mm Thus, a heat sink model 120 according to Comparative Example 1 was prepared for simulation.

Next, the simulation for the heat sink model 120 according to Comparative Example 1 was performed based on the following simulation conditions to obtain the ratio (cell size/maximum thickness), and thermal resistance and pressure loss were obtained as follows. The results are presented in Tables 1A and 1B.

Simulation Conditions
  Software
    Thermal fluid analysis system STREAM (manufactured by Software Cradle Co., Ltd.)
  Mesh Conditions
    Mesh shape: unstructured grid
  Physical Model
    Turbulent flow (k-ε model)
    Steady heat transfer and steady flow
  Material Properties
    Heat sink: aluminum (A6063)
    Heat source: copper (pure copper)
    Coolant: ethylene glycol solution
  Boundary Conditions
    Cooling water temperature: 20° C.
    Flow rate: 10 L/min
    Amount of Heat Generation: 600 W
Thermal Resistance The thermal resistance $R_{hs}$ was calculated based on the following Equation 2:

$$R_{hs}=(T_2-T_1)/Q \qquad \text{Equation 2,}$$

where an amount of heat generation (Q) was set to 600 W, a coolant inlet temperature ($T_1$) was set to 20° C., and a surface temperature ($T_2$) of the heat sink was average of both contact faces of the heat source.

Pressure Loss

The pressure loss $\Delta P_{hs}$ was calculated based on the following Equation 3:

$$\Delta P_{hs}=P_{in}-P_{out} \qquad \text{Equation 3,}$$

where an inlet Pressure ($P_{in}$) was a value of one point at the center of the inlet, and an outlet pressure ($P_{out}$) is set to 0 Pa.

Embodiments 1 to 5 and Comparative Example 2

Using the static pressure distribution obtained from the simulation for Comparative Example 1, the respective heat sink models for Embodiments 1 to 5 and Comparative Example 2 were prepared, and simulation for each heat sink model was performed similarly to Comparative Example 1 to obtain the ratio (cell size/maximum thickness), thermal resistance, and pressure loss. The results are presented in Tables 1A and 1B.

Figure 17:
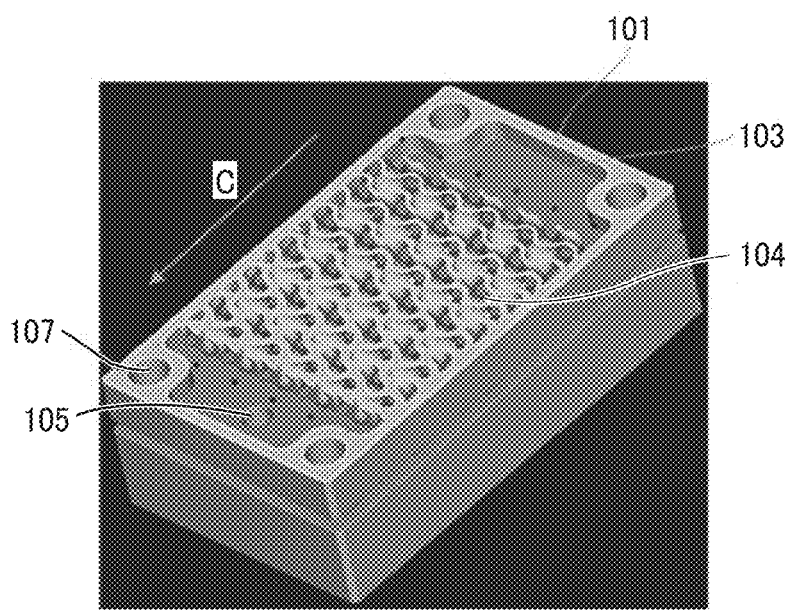
FIG. 17 is a schematic perspective view of a heat sink according to Embodiment 1 of the present disclosure.
Figure 18:
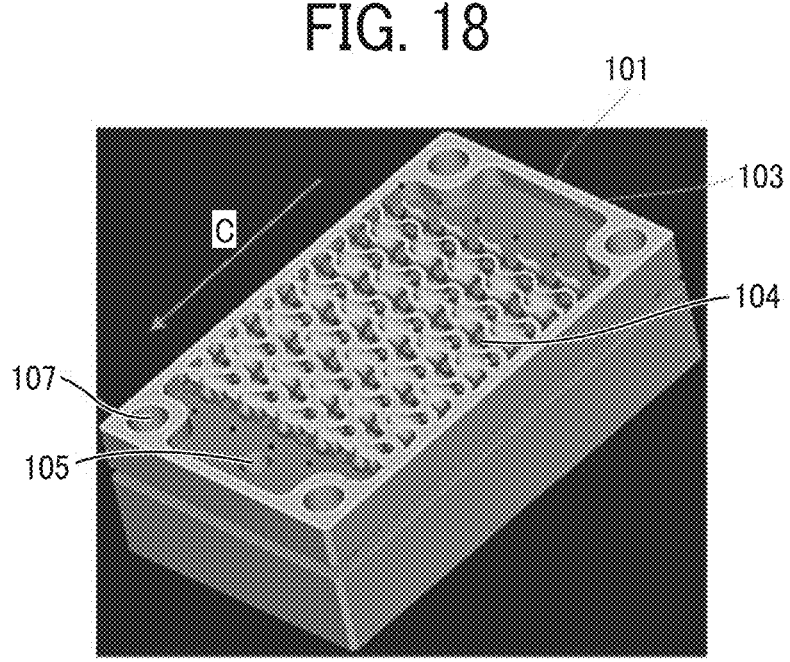
FIG. 18 is a schematic perspective view of a heat sink according to Embodiment 2 of the present disclosure.
Figure 19:
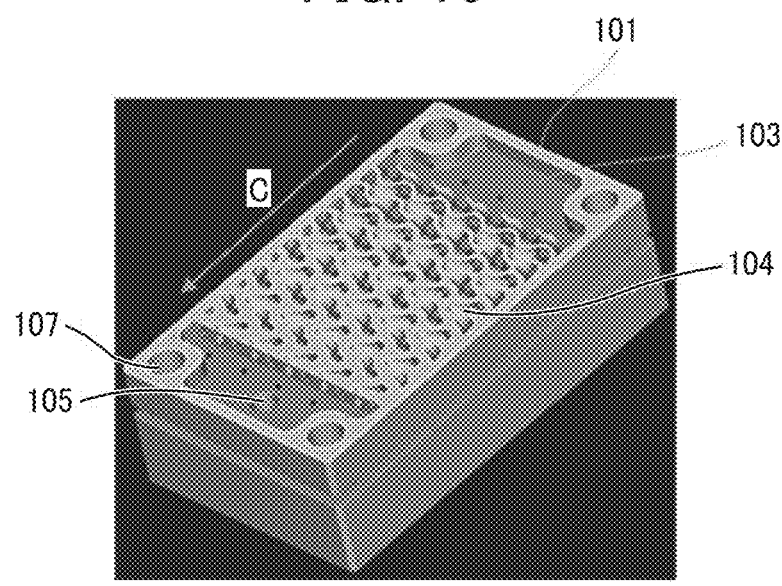
FIG. 19 is a schematic perspective view of a heat sink according to Embodiment 3 of the present disclosure.
Figure 21:
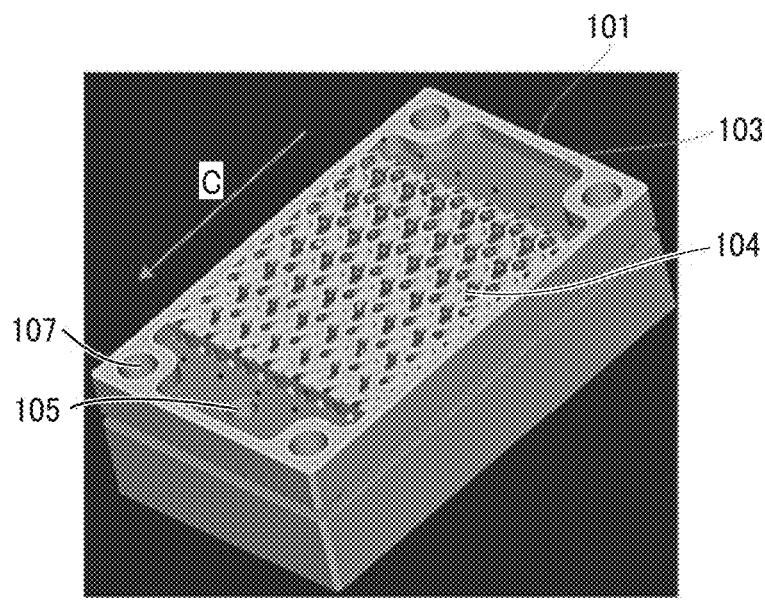
FIG. 21 is a schematic perspective view of a heat sink according to Embodiment 4 of the present disclosure.
Figure 22:
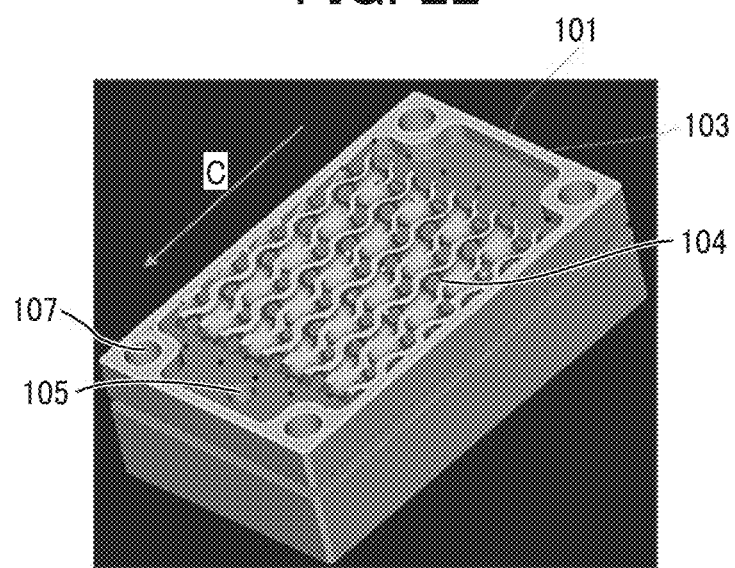
FIG. 22 is a schematic perspective view of a heat sink according to Embodiment 5 of the present disclosure.
Figures 23, 24:
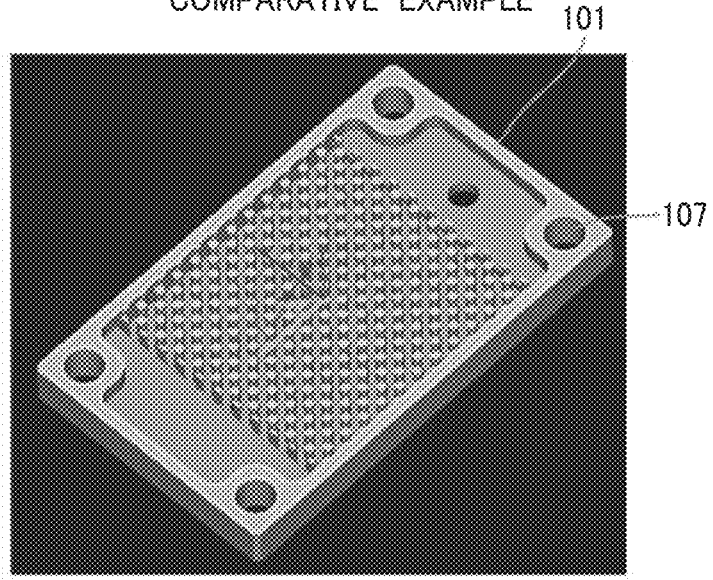
FIG. 23 is a schematic perspective view of a heat sink according to Comparative Example 2.
FIG. 24 illustrates enlarged views of cells at a thinnest portion and a thickest portion of the wall in the gyroid structure portion according to Embodiments 1 to 5.

FIG. 17 is a schematic perspective view of a heat sink body 101 according to Embodiment 1. FIG. 18 is a schematic perspective view of a heat sink body 101 according to Embodiment 2. FIG. 19 is a schematic perspective view of a heat sink body 101 according to Embodiment 3. FIG. 21 is a schematic perspective view of a heat sink body 101 according to Embodiment 4. FIG. 22 is a schematic perspective view of a heat sink body 101 according to Embodiment 5. FIG. 23 is a schematic perspective view of a heat sink body 101 according to Comparative Example 2.

In Embodiments 1 to 3, the maximum thickness (wall thickness) of at least a part of the wall having the gyroid structure portion 104 was changed as illustrated in Table 1A. In Embodiments 4 and 5, the cell size of the unit cell forming the gyroid structure portion 104 was changed as illustrated in Table 1A.

As described above, the gyroid structure portion 104 of each of Embodiments 1 to 5 has a face expressed by the following Equation 1, and the wall having the gyroid structure portion 104 has a non-uniform thickness:

$$\sin(X \times P1)\cos(Y \times P2)+\sin(Y \times P2)\cos(Z \times P3)+\sin(Z \times P3)\cos(X \times P1)=0 \qquad \text{Equation 1,}$$

where X, Y, and Z are real numbers ranging from $-\pi$ to $\pi$, and P1, P2, and P3 are real numbers greater than 0.

Figure 20A:
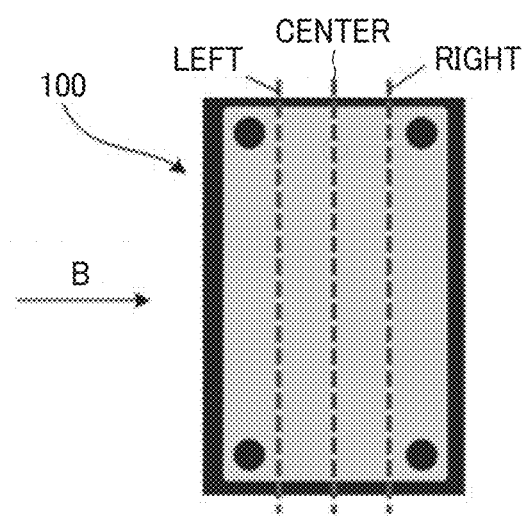
FIG. 20A is a diagram illustrating left, center, and right cross-sectional positions of the heat sink according to Embodiment 3.
Figure 20B:
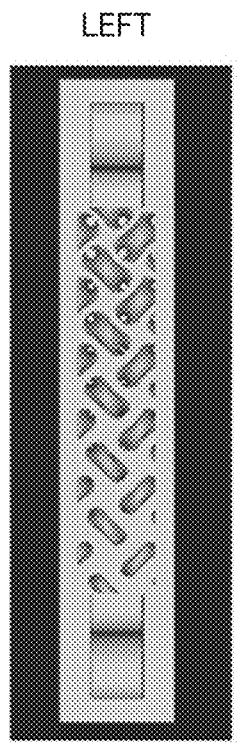
FIGS. 20BA to 20BC are cross-sectional views of the heat sink according to Embodiment 3 at left, center, and right cross-sectional positions illustrated in FIG. 20A.
Figure 20B:
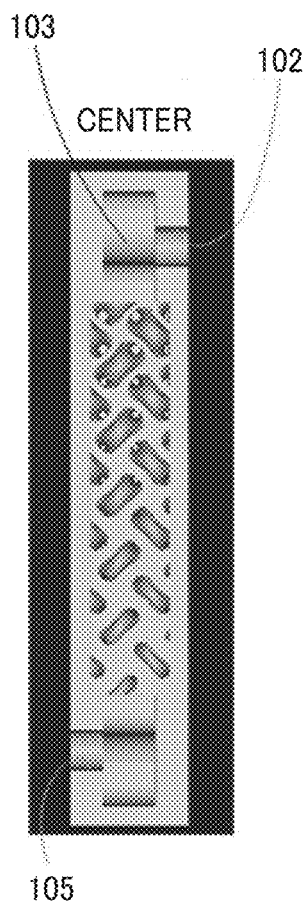
Figure 20B:
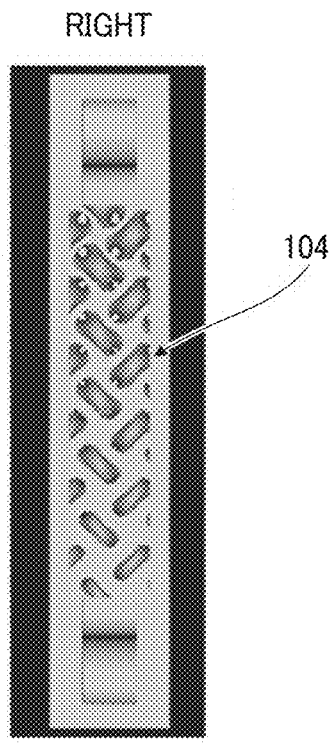

FIG. 20A is a diagram illustrating left, center, and right cross-sectional positions of the heat sink 100 according to Embodiment 3. FIGS. 20BA to 20BC are cross-sectional views of the heat sink according to Embodiment 3 at the left, center, and right cross-sectional positions as viewed in the direction indicated by arrow B in FIG. 20A, respectively.

In Embodiment 3 illustrated in FIG. 20A and FIGS. 20BA to 20BC, the wall in the gyroid structure portion 104 expressed by Equation 1 is thicker from top to bottom (from the water supply port 102 to the water discharge port 105) in the drawings. That is, the wall in the gyroid structure portion 104 has non-uniform thickness in the heat sink.

FIG. 24 illustrates enlarged views of the unit cells at a thinnest portion and a thickest portion of the wall in the gyroid structure portion according to Embodiments 1 to 5. The thickness of the wall in the gyroid structure portion 104 in the heat sink is determined so that the thickness is reduced in a portion where the pressure is high and is increased in a portion where the pressure is low based on the pressure in the channel calculated with uniform thickness by fluid simulation. As a result, in the heat sinks according to Embodiments 1 to 5, the wall is thinnest in the cell adjacent to the side face of the heat sink on the upstream side. That is, the cell has the thinnest wall, for example, near the side face in the upper side in FIGS. 20BA to 20BC, of the heat sink according to Embodiments 3. The same applies to Embodiments 1, 2, 4, and 5. A plurality of cells is disposed in the lateral direction on the upstream side. In the cells on the upstream side, the wall is thinner adjacent to the side face than at the center of the heat sink.

The wall is thickest in the cell adjacent to the side face of the heat sink on the downstream side. That is, the cell has the thickest wall, for example, near the side face in the lower side in FIGS. 20BA to 20BC, of the heat sink according to Embodiments 3. The same applies to Embodiments 1, 2, 4, and 5. A plurality of cells is disposed in the lateral direction on the downstream side. In the cells on the downstream side, the wall is thicker adjacent to the side face than at the center of the heat sink.

TABLE 1A

|  | STRUCTURE OF WALL | CELL SIZE | THICKNESS |
|---|---|---|---|
| EMBODIMENT 1 | GYROID | 10 mm | NON-UNIFORM (1 TO 2 mm) |
| EMBODIMENT 2 | GYROID | 10 mm | NON-UNIFORM (1 TO 3 mm) |
| EMBODIMENT 3 | GYROID | 10 mm | NON-UNIFORM (1 TO 4 mm) |
| EMBODIMENT 4 | GYROID | 8 mm | NON-UNIFORM (1 TO 3 mm) |
| EMBODIMENT 5 | GYROID | 12 mm | NON-UNIFORM (1 TO 3 mm) |
| COMPARATIVE EXAMPLE 1 | GYROID | 10 mm | UNIFORM (1 mm) |
| COMPARATIVE EXAMPLE 2 | PIN FIN | 5 mm | — |

TABLE 1B

|  | CELL SIZE/ MAXIMUM THICKNESS | FLOW RATE (L/min) | PRESSURE LOSS (kPa) | THERMAL RESISTANCE (K/W) |
|---|---|---|---|---|
| EMBODIMENT 1 | 5.0 | 10 | 74.6 | 0.0086 |
| EMBODIMENT 2 | 3.3 | 10 | *1 | *1 |
| EMBODIMENT 3 | 2.5 | 10 | *1 | *1 |
| EMBODIMENT 4 | 2.7 | 10 | *1 | *1 |
| EMBODIMENT 5 | 4.0 | 10 | *1 | *1 |
| COMPARATIVE EXAMPLE 1 | 10.0 | 10 | 65.1 | 0.0101 |
| COMPARATIVE EXAMPLE 2 | — | 10 | 62.5 | 0.0143 |

*1 in Table 1B: the pressure loss and thermal resistance in Embodiments 2 to 5 are at the same level as the pressure loss and thermal resistance in Embodiment 1.

From the results in Table 1B, it was found that Comparative Example 1 (uniform thickness) and Embodiments 1 to 5 (non-uniform thickness) had substantially the same pressure loss, but the thermal resistances in Embodiments 1 to 5 (non-uniform thickness) were smaller than the thermal resistance in Comparative Example 1 (uniform thickness). That is, Embodiments 1 to 5 (non-uniform thickness) has better thermal performance than Comparative Example 1 (uniform thickness).

Aspects of the present disclosure are, for example, as follows.

Aspect 1

A heat sink includes a channel including a gyroid structure portion having a non-uniform thickness.

Aspect 2

In Aspect 1, the gyroid structure portion has a gyroid structure defined by an equation:

$$\sin(X \times P1)\cos(Y \times P2) + \sin(Y \times P2)\cos(Z \times P3) + \sin(Z \times P3)\cos(X \times P1) = 0,$$

where X, Y, and Z are real numbers ranging from $-\pi$ to $\pi$, and P1, P2, and P3 are real numbers greater than 0.

Aspect 3

In Aspect 1 or 2, the channel has a wall defining the channel, and the wall has non-uniform thickness.

Aspect 4

In Aspect 3, the wall has a minimum thickness of 1 mm or more.

Aspect 5

In Aspect 3 or 4, the gyroid structure portion includes a unit cell having a cell size defined by a size of a cube including one cycle of the gyroid structure, and the cell size is 5 mm or more.

Aspect 6

In Aspect 5, a ratio of the cell size of the unit cell to a maximum thickness of the wall is 2.5 or more.

Aspect 7

In any one of Aspect 1 to 6, the heat sink further includes a coupling portion attached to at least one of a water supply port or a water discharge port.

Aspect 8

A method of manufacturing the heat sink according to any one of Aspects 1 to 7 includes laminating powder to form a powder layer and applying a fabrication liquid to the powder layer.

Aspect 9

In Aspect 8, the powder is selected from the group consisting of aluminum, zinc, magnesium, and an alloy thereof.

Aspect 10

In Aspect 9, the fabrication liquid has a viscosity of 5 mPa s or more and 50 mPa s or less at 25° C.

Aspect 11

A gyroid structure component includes a gyroid structure portion including a wall having a non-uniform thickness.

Aspect 12

In Aspect 11, the gyroid structure portion has a gyroid structure defined by an equation:

$$\sin(X \times P1)\cos(Y \times P2) + \sin(Y \times P2)\cos(Z \times P3) + \sin(Z \times P3)\cos(X \times P1) = 0,$$

where X, Y, and Z are real numbers ranging from $-\pi$ to $\pi$, and P1, P2, and P3 are real numbers greater than 0.

Aspect 13

A heat exchanger includes the gyroid structure component according to Aspect 11 or 12.

Aspect 14

A method of manufacturing the gyroid structure component according to Aspect 11 or 12 includes laminating powder to form a powder layer and applying a fabrication liquid to the powder layer.

The heat sink according to any one of Aspect 1 to 7, the method of manufacturing the heat sink according to any one of Aspects 8 to 10, the gyroid structure component according to Aspect 11 or 12, the heat exchanger according to Aspect 13, and the method of manufacturing the gyroid structure component according to Aspect 14 solve the various conventional problems and achieve the object of the present disclosure.

As described above, according to the present disclosure, the heat sink and the gyroid structure component can be provided to significantly enhances thermal performance The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A heat sink assembly, comprising:
a first heat sink and a second heat sink stacked together; and
a heat source disposed between the first heat sink and the second heat sink, wherein the first heat sink comprises:
a channel including a gyroid structure;
a fluid supply port; and
a fluid discharge port,
a fluid flows from upstream to downstream of the first heat sink,
the gyroid structure includes a wall having a non-uniform thickness, and
a first thickness of the wall at a downstream position is thicker than a second thickness of the wall at an upstream position.

2. The heat sink assembly according to claim 1, wherein the gyroid structure is defined by an equation:

$$\sin(X \times P1)\cos(Y \times P2) + \sin(Y \times P2)\cos(Z \times P3) + \sin(Z \times P3)\cos(X \times P1) = 0,$$

where X, Y, and Z are real numbers ranging from $-\pi$ to $\pi$, and P1, P2, and P3 are real numbers greater than 0.

3. The heat sink assembly according to claim 1, wherein the wall has a minimum thickness of 1 mm or more.

4. The heat sink assembly according to claim 1, wherein the gyroid structure includes a unit cell having a cell size defined by a size of a cube including one cycle of the gyroid structure, and the cell size is 5 mm or more.

5. The heat sink assembly according to claim 4, wherein a ratio of the cell size of the unit cell to a maximum thickness of the wall is 2.5 or more.

6. The heat sink assembly according to claim 1, wherein the first heat sink further comprises a coupling portion attached to at least one of the fluid supply port or the fluid discharge port.

7. The heat sink assembly according to claim 1, wherein the gyroid structure includes a unit cell, and
the wall is thinnest in a cell adjacent to a side face of the heat sink at an upstream side.

8. The heat sink assembly according to claim 1, wherein the gyroid structure includes a unit cell, and
the wall is thinner adjacent to a side face than at a center of the heat sink in cells at an upstream side.

9. The heat sink assembly according to claim 1, wherein the gyroid structure includes a unit cell, and
the wall is thickest in a cell adjacent to a side face of the heat sink at a downstream side.

10. The heat sink assembly according to claim 1, wherein the gyroid structure includes a unit cell, and
the wall is thicker adjacent to a side face than at a center of the heat sink in cells at a downstream side.

11. The heat sink assembly according to claim 1, wherein the second heat sink comprises a second channel including a second gyroid structure.

12. The heat sink assembly according to claim 1, wherein the second heat sink includes a second fluid supply port and a second fluid discharge port.

13. The heat sink assembly according to claim 1, further comprising a coupling portion disposed between the first heat sink and the second heat sink, the coupling portion forming a flow path between the first heat sink and the second heat sink.

14. The heat sink assembly according to claim 1, wherein the non-uniform thickness of the wall of the first heat sink is configured to provide a uniform fluid flow throughout the channel.

15. The heat sink assembly according to claim 1, wherein the first heat sink and the second heat sink are manufactured by a process including laminating a powder to form a powder layer and applying a fabrication liquid to the powder layer.

16. The heat sink assembly according to claim 15, wherein the powder is an aluminum alloy.

17. The heat sink assembly according to claim 1, wherein in cells at a downstream side of the first heat sink, the wall of the gyroid structure is thicker adjacent to a side face of the first heat sink than at a center of the first heat sink.

18. The heat sink assembly according to claim 1, wherein in cells at an upstream side of the first heat sink, the wall of the gyroid structure is thinner adjacent to a side face of the first heat sink than at a center of the first heat sink.

* * * * *